(12) United States Patent
Gledhill

(10) Patent No.: US 9,488,304 B2
(45) Date of Patent: Nov. 8, 2016

(54) TECHNIQUES FOR JOINING LINED PIPELINES

(75) Inventor: Peter Lockwood Gledhill, Holmes Chapel (GB)

(73) Assignee: Subsea 7 Limited, London (GB)

( * ) Notice: Subject to any disclaimer, the term of this patent is extended or adjusted under 35 U.S.C. 154(b) by 728 days.

(21) Appl. No.: 13/703,616

(22) PCT Filed: Jun. 10, 2011

(86) PCT No.: PCT/GB2011/051088
§ 371 (c)(1),
(2), (4) Date: Jul. 19, 2013

(87) PCT Pub. No.: WO2011/154749
PCT Pub. Date: Dec. 15, 2011

(65) Prior Publication Data
US 2013/0284962 A1    Oct. 31, 2013

(30) Foreign Application Priority Data

Jun. 11, 2010   (GB) .................................. 1009807.7

(51) Int. Cl.
| | |
|---|---|
| *F16L 55/00* | (2006.01) |
| *F16L 29/00* | (2006.01) |
| *F16J 15/02* | (2006.01) |
| *F16L 13/02* | (2006.01) |
| *F16L 58/10* | (2006.01) |
| *F16L 58/18* | (2006.01) |

(52) U.S. Cl.
CPC .............. *F16L 29/00* (2013.01); *F16J 15/025* (2013.01); *F16L 13/0263* (2013.01); *F16L 58/1009* (2013.01); *F16L 58/181* (2013.01)

(58) Field of Classification Search
USPC ................... 285/55, 369, 370, 371, 397, 398
See application file for complete search history.

(56) References Cited

U.S. PATENT DOCUMENTS

| | | | | |
|---|---|---|---|---|
| 3,508,766 | A * | 4/1970 | Berg ................... | F16L 13/0263 228/178 |
| 5,346,261 | A * | 9/1994 | Abbema ............ | F16L 13/0263 285/22 |
| 5,988,691 | A | 11/1999 | Cruickshank | |
| 2006/0145479 | A1* | 7/2006 | McIntyre ............ | F16L 13/0263 285/370 |
| 2011/0193339 | A1* | 8/2011 | Kenworthy ........... | B29C 65/344 285/21.2 |

FOREIGN PATENT DOCUMENTS

| | | |
|---|---|---|
| DE | 28 40 962 | 4/1979 |
| WO | WO 02/33298 A1 | 4/2002 |
| WO | WO 2004/011840 A1 | 2/2004 |

* cited by examiner

*Primary Examiner* — Aaron Dunwoody
(74) *Attorney, Agent, or Firm* — Levy & Grandinetti

(57) ABSTRACT

A connector for lined pipelines includes a tube having opposed male interface elements extending inwardly from respective ends of the tube. One or more circumferential permeable chokes project radially from each male interface element. The chokes minimize flow of oxidizing fluid from the bore into the micro-annulus between the liner and the pipe while maximizing flow of fluid from the micro-annulus into the bore in the event of catastrophic pressure drop in the bore. To maintain gaps between the tube ends and the pipe liners for fluid flow, shoulder formations defined by radially-projecting bands extend circumferentially around the tube. The connector may be used in a joint arrangement where each liner includes a body section, an end section of lesser thickness and greater bore than the body section that terminates short of an end of the pipe, an inner step disposed between the body section and the end section, and an outer step disposed between the end section and the pipe.

31 Claims, 10 Drawing Sheets

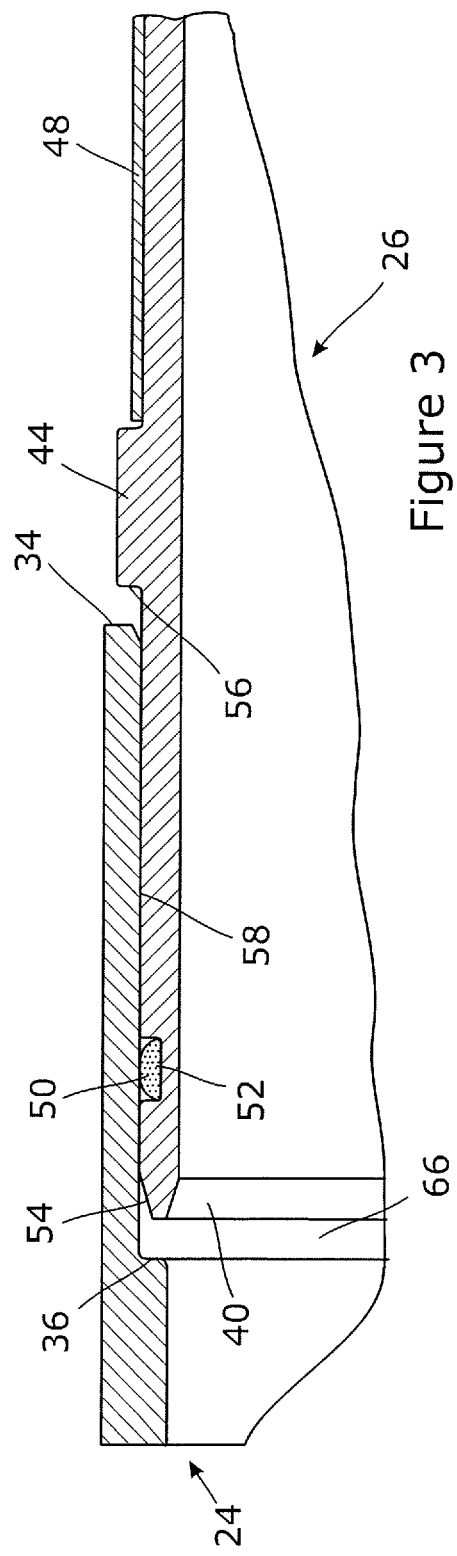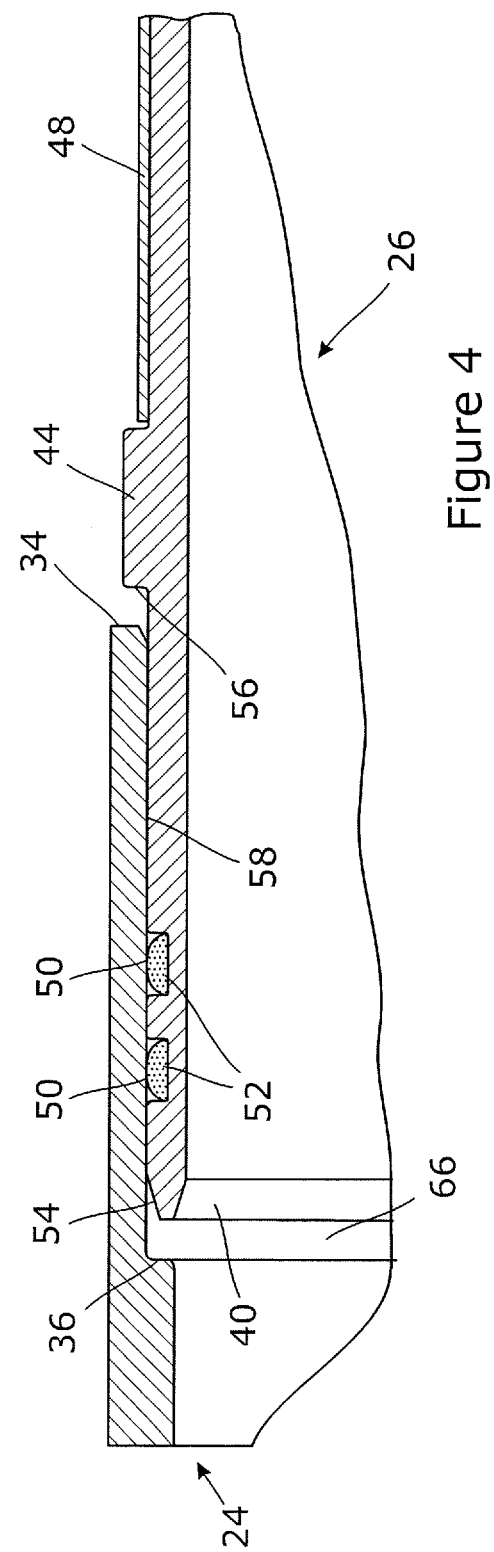

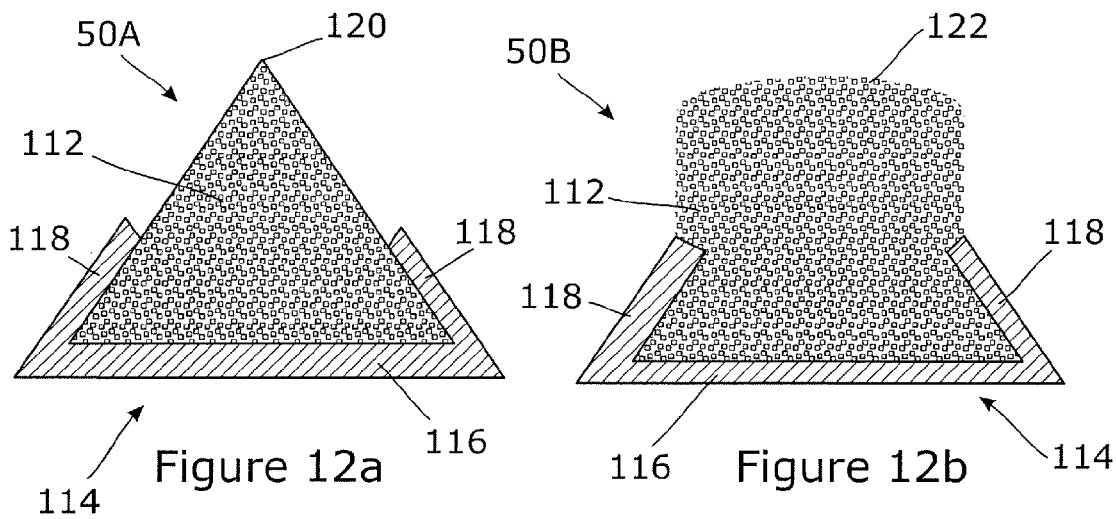
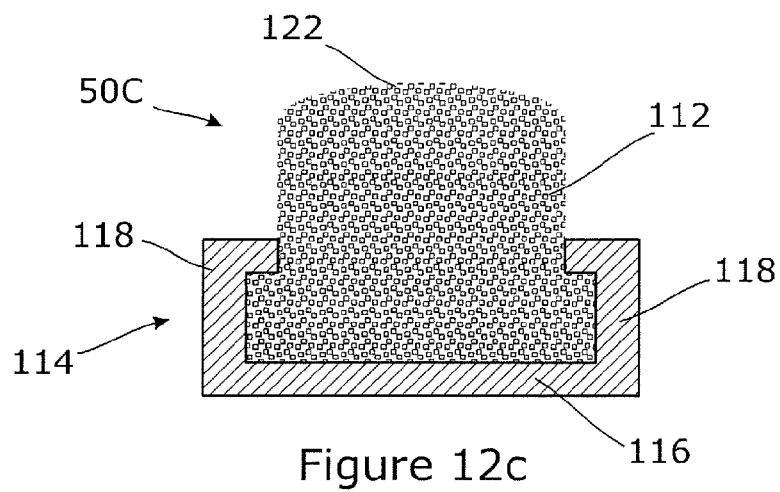
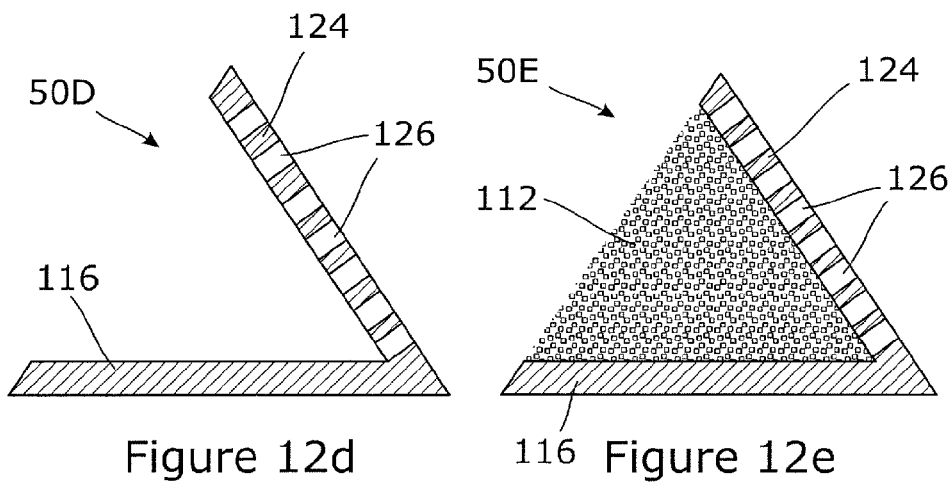
Figure 12a  Figure 12b  Figure 12c  Figure 12d  Figure 12e

TECHNIQUES FOR JOINING LINED PIPELINES

This application is the U.S. National Phase of International Application Number PCT/GB2011/051088 filed on Jun. 10, 2011, which claims priority to Great Britain Application Number 1009807.7 filed on Jun. 11, 2010.

This invention relates to techniques for joining lined pipelines as used in the oil and gas industry for production, for water injection or for other purposes. The invention is particularly concerned with a connector for bridging across a weld between abutting lined pipes. The invention is also concerned with methods for making, connecting and welding such lined pipes.

Corrosion protection is a key issue for pipelines used in the oil and gas industry, which are usually made of carbon steel to reduce cost over often great lengths. Liners of composites or plastics, for example, high density polyethylene (HDPE) have been used for many years to mitigate internal corrosion of such pipelines, as an alternative to more expensive liners of corrosion-resistant alloys (CRA) such as Inconel 625 (trade mark). Plastics or composite liners also aid insulation of the pipeline.

For brevity, plastics or composite liners will be referred to collectively in this specification as plastics liners unless the context requires otherwise.

Whilst effective, plastics liners suffer from problems in practice. One such problem is permeation of fluids. During operation, liquids and/or gases present in the fluid flowing through the pipeline tend to pass through (or, via any gaps, around) the liner to enter the micro-annulus between the liner and the surrounding pipe. Transfer of fluid into the micro-annulus will continue until the pressure in the micro-annulus matches that of the fluid flowing through the bore of the pipeline. Then, any rapid reduction of pressure in the bore will lead to an overpressure in the micro-annulus that may not equalise quickly and may therefore cause the liner to collapse inwardly. This is a particular problem for water injection service where sudden depressurisation is known to have occurred.

Another problem of plastics liners is that they create difficulties when forming joins between lengths of lined pipe. The heat of conventional butt welding between the steel pipe lengths may damage the lining. Whilst it is possible to join the lengths of pipe by other means such as threaded or flanged connections, such connections are often impractical in the context of subsea operations where, for example, a pipeline may need to be spooled onto a reel or launched from a vessel using an S-lay or J-lay technique.

There is a need for an easy-to-install liner connector that provides for effective thermal protection and effective equalisation of pressure between the micro-annulus and the bore to avoid liner collapse, but without exposing the inner surface of the pipe to excessive corrosion. There is also a need to enable lengths of steel pipe with plastics liners to be joined by welding while maintaining a substantially continuous corrosion-resistant internal surface between them.

The connector of the invention satisfies those needs, providing a connector that bridges the pipe weld and engages with the liner in the encompassing pipes while surviving the thermal load of the welding process. The connector of the invention also permits equalisation of pressure in the micro-annulus while sufficiently isolating the inner wall surface of a steel pipe from bulk of the product carried by the pipeline to reduce corrosion of that surface.

Efforts have been made previously by others to address those needs. For example, U.S. Pat. No. 5,988,691 to Coflexip discloses a pipe joint comprising welded pup pieces lined with CRA. End pieces of HDPE are fusion-welded to respective liners in the abutting pipes and carry CRA inserts that are seal-welded to the CRA lining of the pup pieces. A gap is left between the end pieces to permit butt welding of the pipe ends without damage to the liners, although an optional transition sleeve may be provided to fill the gap. However, there is no provision in U.S. Pat. No. 5,988,691 for venting the micro-annulus between the liner and the pipe.

WO 02/33298 to Boreas discloses a lined pipeline having vent devices extending through the liner to allow gas to flow from the micro-annulus to the bore. There is no discussion in WO 02/33298 of a joint between abutting lengths of lined pipe. In contrast, WO 2004/011840, also to Boreas, proposes a pipe liner connector for connecting adjacent lengths of pipe liner in a Pressure Balanced Joint (PBJ). An objective of the PBJ is to control exposure of the pipe wall to corrosive agents, specifically by preventing mass transport of bore fluids to the pipe wall so as to minimise replenishment of corrosion-promoting agents, especially oxygen or nutrients for sulphate-reducing bacteria. To this end, o-rings seal the pipe liner connector to the liners of the abutting pipe lengths. Vents (as sold under the trade mark 'Linavent') extend through the wall of the pipe liner connector, with the aim of allowing gas to flow from the micro-annulus to the bore for equalisation. A central heat-shielding cylindrical layer lies below the interface between abutting pipe lengths to enable welding without damaging the pipe liner connector. This allows regular carbon steel welding for all passes, including the root pass.

Boreas' solution in WO 2004/011840 is unworkable in practice as its sealing o-rings do not have sufficient elasticity to cope well with ovality or misalignment of the pipes. Pipes are manufactured slightly oval in cross section and the ovality is modified by bending and straightening processes involved in pipeline deployment from a pipe-laying ship. Additional ovalisation of 4 mm on a 12" OD (305 mm) pipe of 22.2 mm wall thickness is typical and it will often occur in a different radial direction to the natural ovality of the pipe. Also, the pipe liner connector of WO 2004/011840 must be held in place by locking rings, which adds to the cost, complexity and process time of creating a joint.

The connector of WO 2004/011840 has other drawbacks. For example, it cannot accommodate significant movement or 'creep' of the liner with respect to the pipe. Creep will occur after the liner is installed and is also experienced during bending and straightening operations on an installation vessel when pipelaying. Also, the connector of WO 2004/011840 is not optimised to reduce turbulence in the fluid flowing through the bore of the pipeline.

Another problem with the connector of WO 2004/011840 is that even if the o-ring seals are effective (which, due to ovality, they probably will not be), a substantial volume of liquid may enter and travel along the micro-annulus between the liner and the pipe. That liquid will pass through the narrow bores (typically 3 mm diameter) of the 'Linavent' vents leading from the bore through the wall of the connector to the annulus around the connector and from there to the micro-annulus between the liner and the pipe. Post-deployment, the compressive loads between the liner and the pipe are nearly equal on diametrically-opposed sides of the pipe wall and the lowest compressive load between the liner and the pipe is on the major axis of the pipeline between those opposed sides. This provides a path for conveying liquid along the micro-annulus. In practice, flow may be generated along the micro-annulus between the liner and the pipe and the annulus between the connector and the liner.

Even at low differential pressures of say 0.5 bar, the micro-annulus of a lined pipe has been observed to hold an estimated 1.5 liters of liquid over a typical 11 m pipe 'joint'. Such a volume of liquid in contact with the inner wall of the pipe may promote corrosion, especially if there is any significant interchange of liquid between the bore and the micro-annulus that will refresh the oxygen or other corrosive agents in that volume of liquid. The connector of WO 2004/011840 recognises this problem and attempts to reduce interchange as the 'Linavent' vents are baffled with a sintered frit. However the bigger problem is that once liquid has entered the micro-annulus, it presents a risk of collapsing the liner and the connector if there is a rapid drop of pressure of the product flowing along the bore of the pipe. The 'Linavent' vents are too constricted to allow rapid equalisation of pressure between the micro-annulus and the bore of the pipe where a substantial volume of liquid is present in the micro-annulus.

There remains a need for a simple and economical joint that allows effective equalisation while being suitable for use with offshore-welded plastics-lined pipe joints used in S-lay and J-lay techniques.

It is against this background that the present invention has been made.

From one aspect, the invention resides in a connector for lined pipelines, the connector comprising: a tube having opposed ends, the tube defining opposed male interface elements extending inwardly from respective ends of the tube; and at least one circumferential permeable choke projecting radially from each male interface element to control fluid flow around the tube in use.

The inventive concept also encompasses a pipeline joint arrangement between lined pipes abutting end-to-end, wherein the joint comprises a connector of the invention as defined above, bridging spaced-apart liners of the pipes; and each liner comprises: a body section; an end section of lesser thickness and greater bore than the body section; and an inner step disposed between the body section and the end section; and wherein: a respective male interface element of the connector is received telescopically by the end section of each liner, with mutual clearance defining an annular channel between the male interface element of the connector and the end section of the liner; a respective end of the tube opposes the inner step of each liner; and at least one permeable choke extends radially from each male interface element to the opposed end section of each liner to control fluid flow in the respective channels in use of the pipeline.

The inventive concept extends to a pipeline comprising a plurality of connectors of the invention as defined above or a plurality of joint arrangements of the invention as defined above.

The choke permits pressure equalisation through the channel while restricting interchange of liquid between the bore of the pipeline and the micro-annulus between the liner and the pipe. Whilst each male interface element may have only one choke, it is also possible for there to be a plurality of chokes on each male interface element, the chokes being disposed sequentially relative to a fluid flow direction through the chokes. Preferably, the tube of the connector has a continuous wall that is uninterrupted by openings between its ends. Thus, the choke alone controls flow of fluid around the connector.

The connector of the invention preferably further comprises shoulder formations that project radially from the exterior of the tube and are located inward of respective male interface elements of the connector. A shoulder formation may, for example, be defined by a band extending circumferentially around the tube. This strengthens and protects the tube and an insulator layer positioned around the tube. It is also possible to remove the connector from a pipe by pulling on the shoulder formation.

More specifically, spaced-apart bands may define respective shoulder formations, in which case the insulator layer is suitably disposed between the bands for protection. To this end, it is preferred that the bands project radially beyond the thickness of the insulator layer. The insulator layer can be made from any suitable compliant or segmented insulation material, and must not interfere with the root of the weld; it may, for example, comprise a microgel insulator supported by a backing tape. The bands are suitably disposed symmetrically each side of a central plane that bisects the tube and that is oriented orthogonally to its central longitudinal axis.

Where the end section of the liner terminates short of an end of the pipe, the shoulder formation of the connector suitably opposes an outer step of the liner disposed between the end section and the pipe. This limits axial movement of the connector with respect to the liner. Preferably, the distance between the shoulder formation and the nearest end of the tube is less than the length of the opposed end section of the liner, and the distance between the inner steps of the liners is longer than the tube of the connector. This ensures that a gap is maintained between at least one end of the tube and the opposed inner step of the liner, which gap communicates between a channel and the bore of the tube.

It is preferred that the shoulder formation defines an overall width of the connector that is less than the internal diameter of the pipes in the region between their abutting ends and the end sections of their liners. This maintains clearance to reduce heat transmission to the connector during welding. The outer diameter of the shoulder formation should clear the root of the weld to enable a simple axial pull in order to recover the connector.

It is also preferred that the internal tubular surface of the connector is substantially aligned with the bore of a lined pipe at the body section. This reduces turbulence of fluid flowing along the pipe and facilitates pigging. To this end, the difference in liner thickness between the body section and the end section of the liner is preferably substantially equal to the wall thickness of the tube plus the clearance between the male interface element of the connector and the end section of the liner.

The liners of the pipes are preferably oversized in outer diameter with respect to the internal diameter of the pipes, rolled-down and pultruded into position within the pipes, without locking rings.

Radiusing or chamfering is preferably applied to various edges and corners of the connector or the liner for stress relief, to ease assembly of a joint and/or to reduce turbulence in use. Radiusing or chamfering may for example be applied to least one of: an inner radial end edge of the tube; an outer radial end edge of the tube; an inner radial edge of the outer step; and an inner radial edge of the inner step. However, over-radiusing of the chamfers would be detrimental to the stability of the connector at a desired position with respect to the liner.

The inventive concept also embraces the choke itself. The choke of the invention comprises a permeable mass such as a porous foam and/or a barrier web penetrated by openings to confer permeability. The choke may be received in a circumferential groove extending around the male interface element and suitably bears resiliently against the end section of the liner with radial force. Nevertheless, it is preferred that the choke is collapsible away from the liner over a threshold differential pressure applied across the choke.

Where employed, the porous mass is suitably retained in a holder comprising a base web and at least one retaining wall upstanding from the base web. Where employed, the barrier web may be inclined relative to a base web of the choke or to the male element of the connector. For example, the barrier web may be inclined outwardly from the male element toward the adjacent end of the tube.

More generally, the choke may be asymmetric in section. It may have a composite structure comprising first and second components of different stiffness and/or permeability, which components are preferably disposed sequentially relative to a fluid flow direction through the choke. Thus, the choke may have asymmetric response to pressure within the channel to each side of the choke.

The inventive concept also encompasses a method of assembling a pipeline joint, comprising: providing a first lined pipe whose liner comprises: a body section; and an end section of lesser thickness and greater bore than the body section; inserting into the end of the first pipe a connector of the invention, such that one male interface element of the connector is received telescopically by the end section of the liner with the choke extending radially between the male interface element and the end section, while leaving the opposed male interface element protruding from the end of the first pipe; bringing a second lined pipe into end-to-end abutting relation with the first pipe, the liner of the second pipe having a corresponding body section and end section such that the opposed male interface element of the connector is received telescopically by the end section of the liner of the second pipe, with the choke of the opposed male interface element extending radially between that male interface element and that end section; and joining the pipes where they abut end-to-end.

Where the connector has a shoulder formation and the liner of the first pipe terminates short of an end of the pipe, insertion of the connector into the first pipe is preferably limited by the shoulder formation of the connector bearing against an outer step of the liner disposed between the end section and the pipe. More preferably, the shoulder formation of the connector bears against the outer step of the liner before the end of the tube of the connector contacts an inner step of the liner disposed between the body section and the end section.

The pipes are suitably joined by welding, in which case cooling is preferably applied internally within the tube of the connector. Such cooling may, for example, be provided by air blown radially against the internal surface of the connector tube. It is also possible to cool the pipe externally after a welding station or between welding stations. The temperature of the connector may be controlled by monitoring the external pipe temperature around the weld.

An alignment tool may be attached to either pipe, the alignment tool comprising a plurality of alignment blocks angularly spaced around and overlapping an end of the pipe. Then, the other pipe may be inserted between the overlapping parts of the alignment blocks before bringing the second lined pipe into end-to-end abutting relation with the first pipe.

This specification primarily describes pipelines for water injection, which experience a particularly high rate of corrosion due to dissolved oxygen in the filtered sea water flowing within. The invention will therefore be described with particular reference to steel pipes lined with HDPE for carrying sea water, but it should be understood that the materials described may be varied as necessary to meet the requirements of other fluids. Thus, the inventive concept has wider application and may have benefit in handling hydrocarbons and other corrosive fluids.

It should be noted that in a broad sense, the invention is not limited to welded pipelines because other techniques such as adhesives or a mechanical connection may be used for joining lengths of pipe. Also the invention is not limited to a contact/interference connection between the connector and the pipe; for example, a form of thermal welding could be used, enabling the connector to be left in place in case the integrity of the pipe weld/connection is breached. It should also be noted that the broadest concept of the invention is not limited to steel pipelines, as some features of the connector may have benefit in pipelines made of other materials such as composites.

In order that the invention may be more readily understood, reference will now be made, by way of example, to the accompanying drawings in which:

FIG. 3 is an enlarged detail view of an interface part highlighted in FIG. 2;

Figure 5:
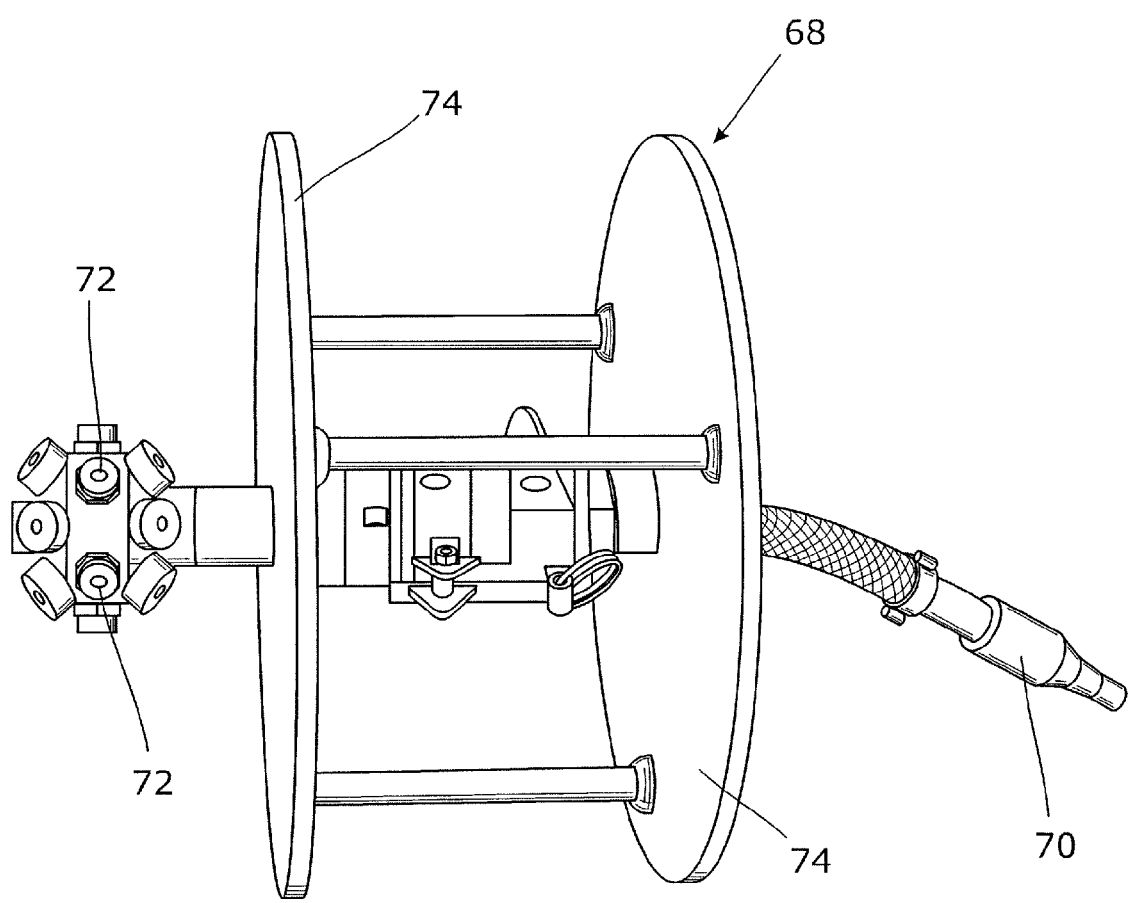
Figure 6:
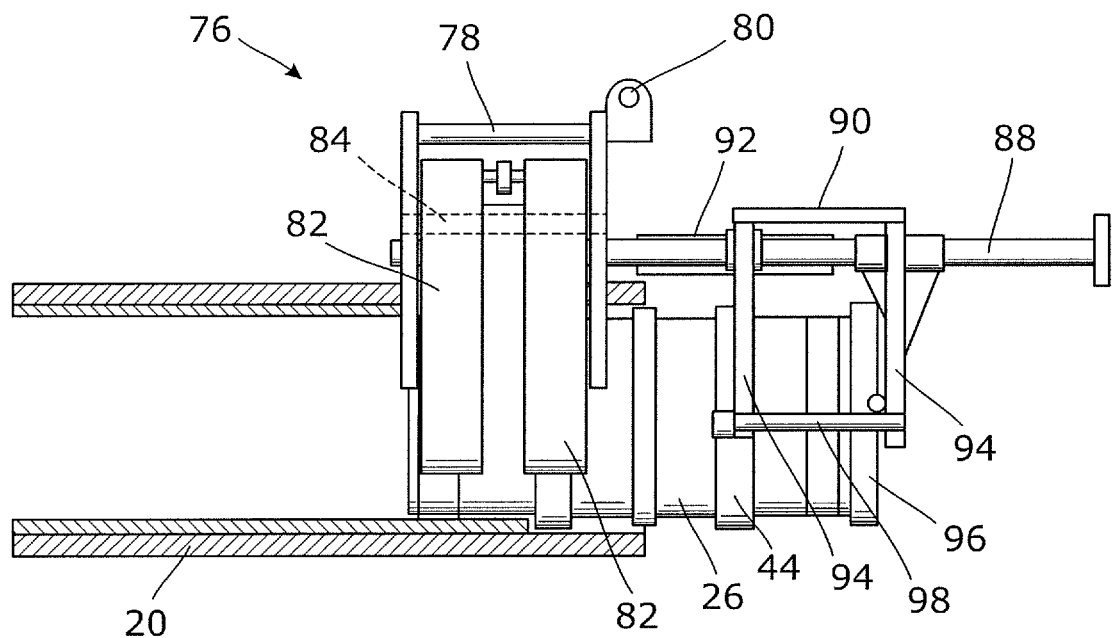
Figure 7:
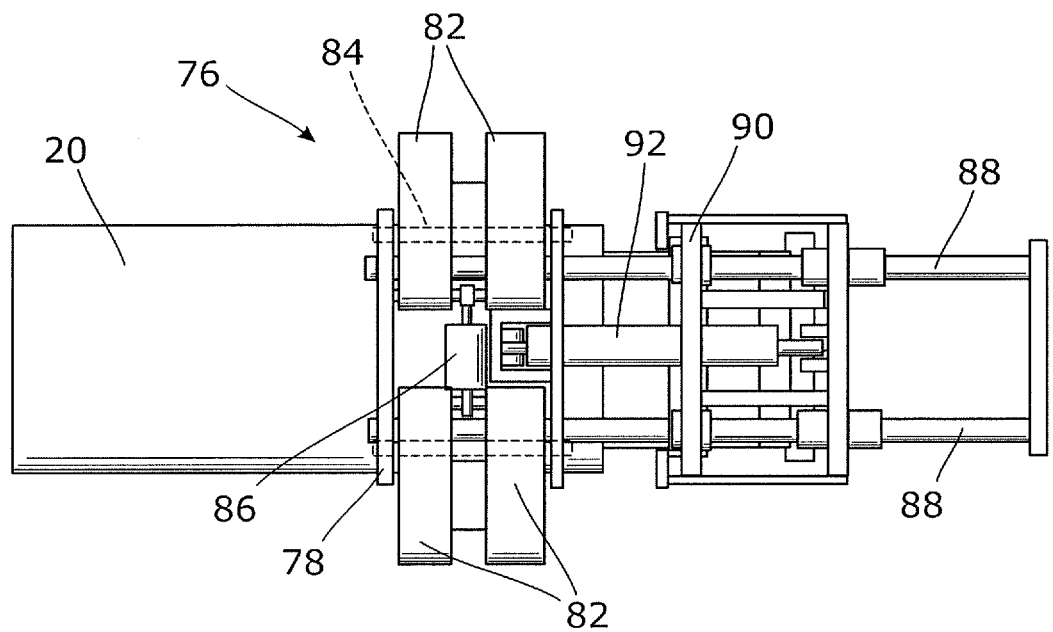
Figure 8:
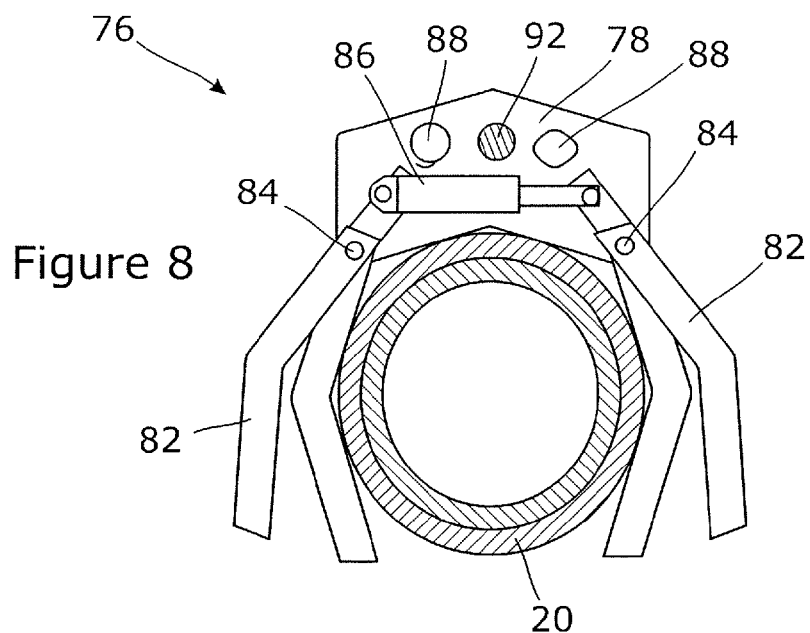
Figure 9:
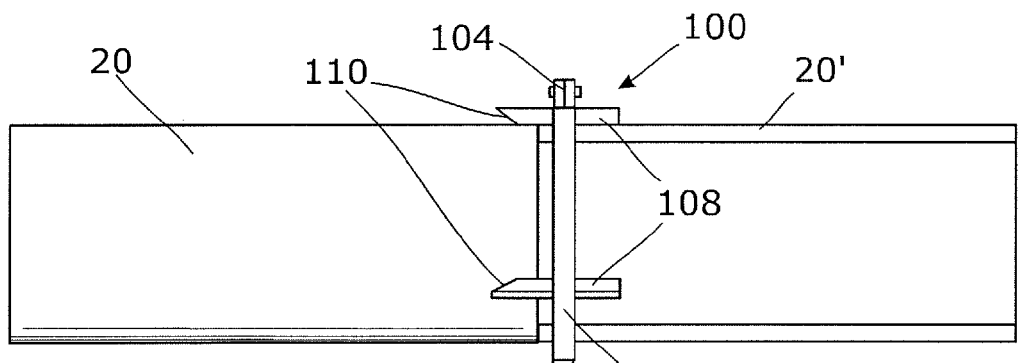
Figure 10:
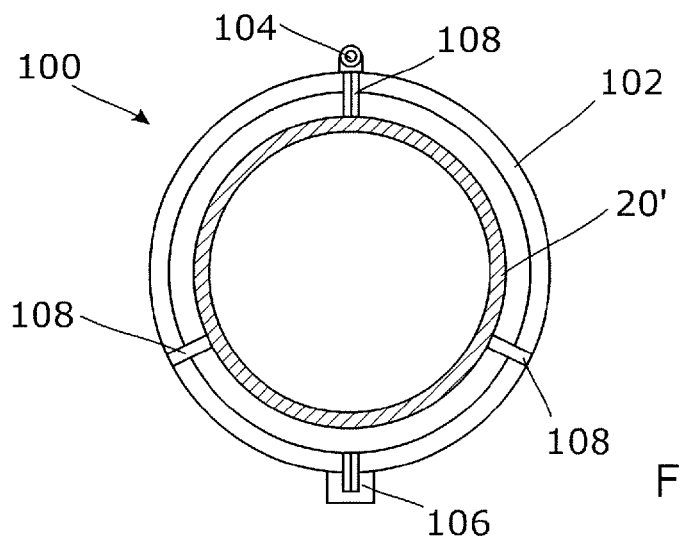
Figure 11:
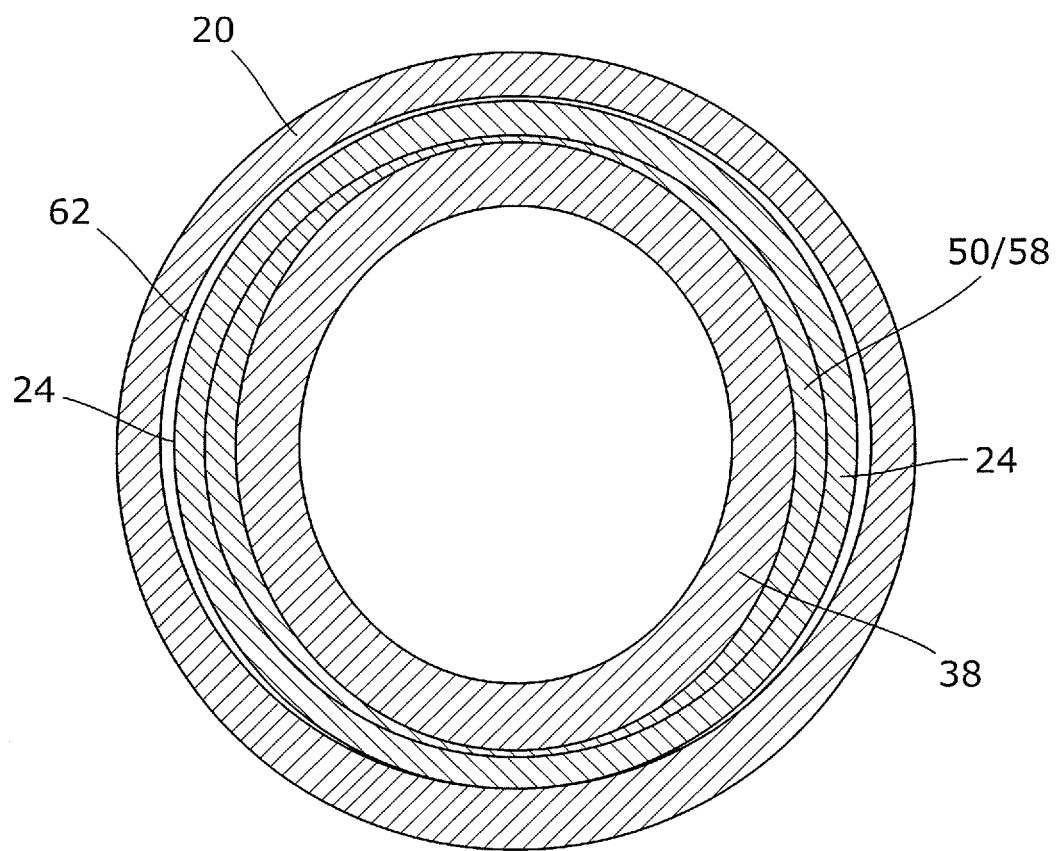
Figure 13A:
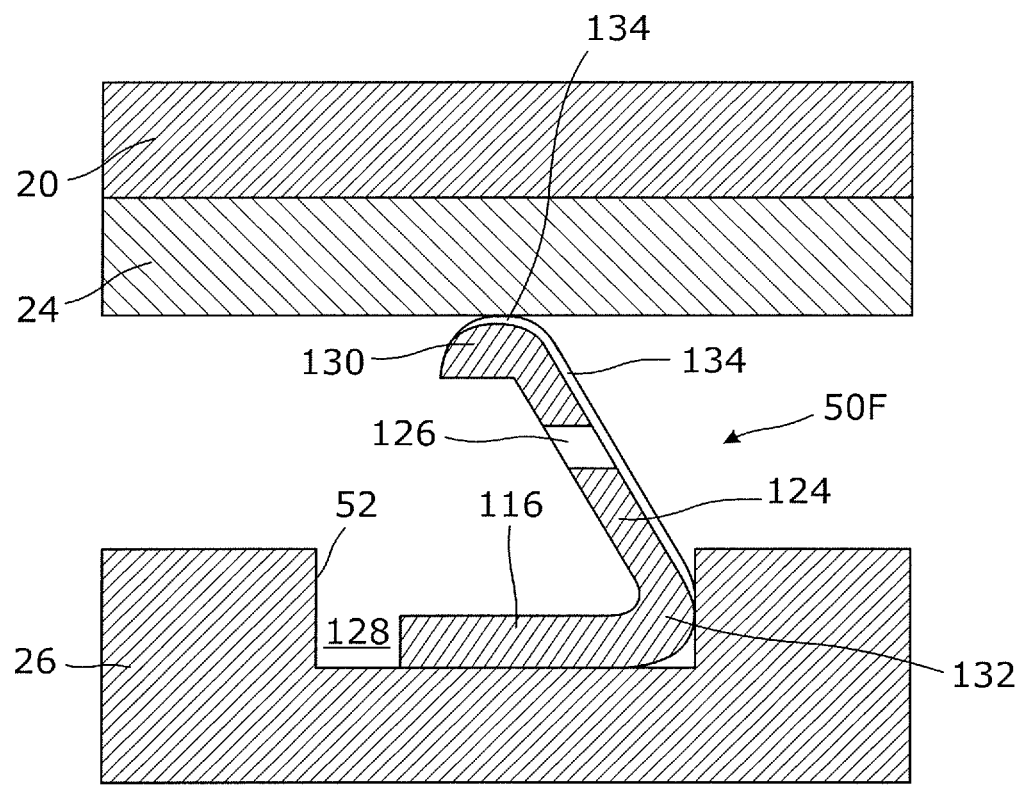
Figure 13B:
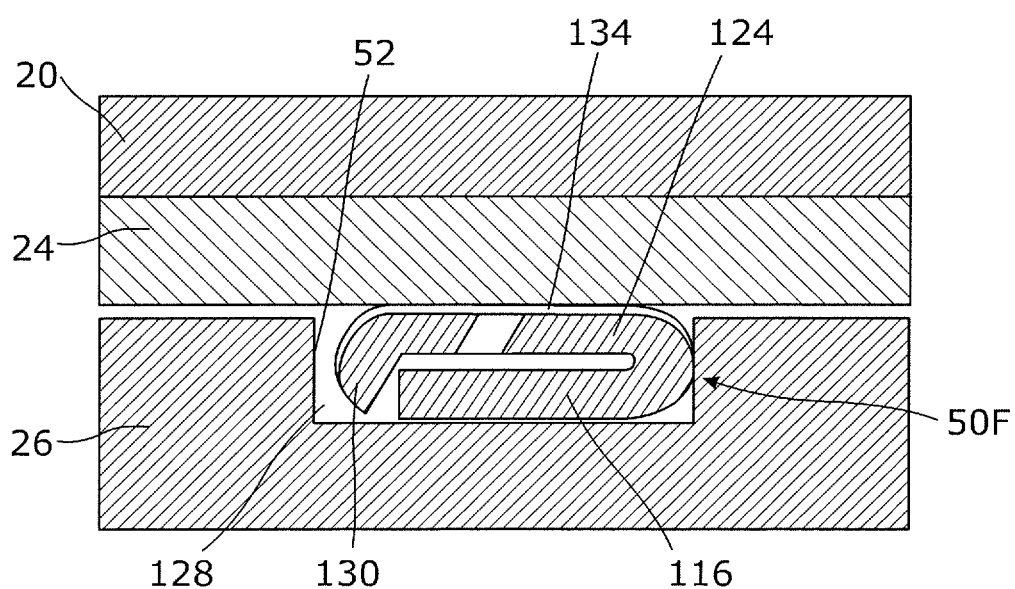
Figure 14A:
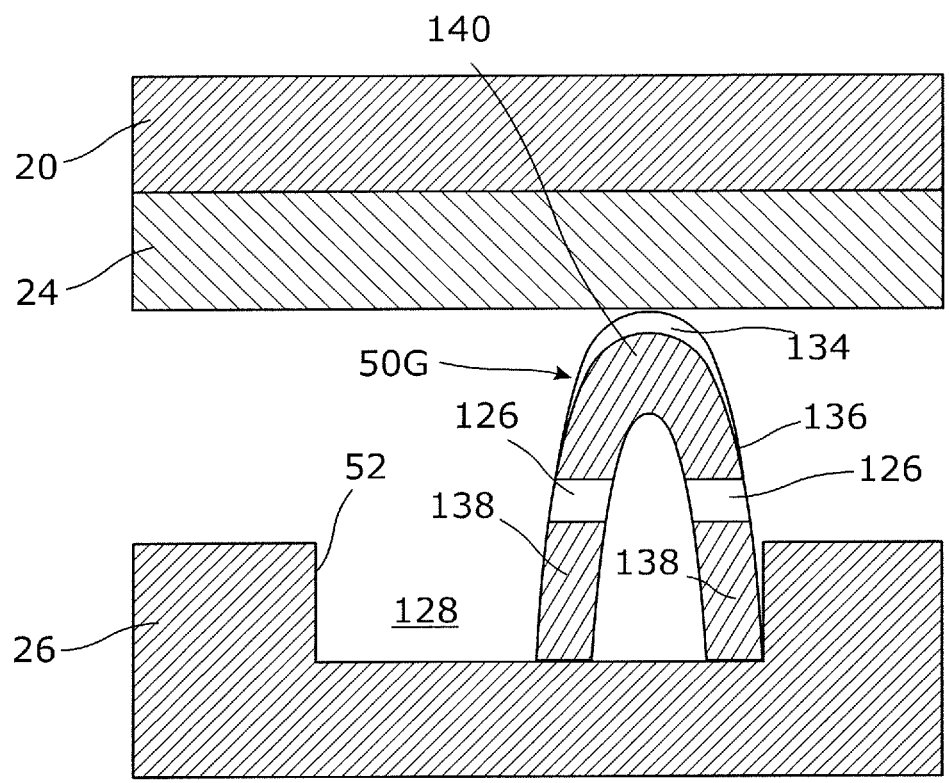
Figure 14B:
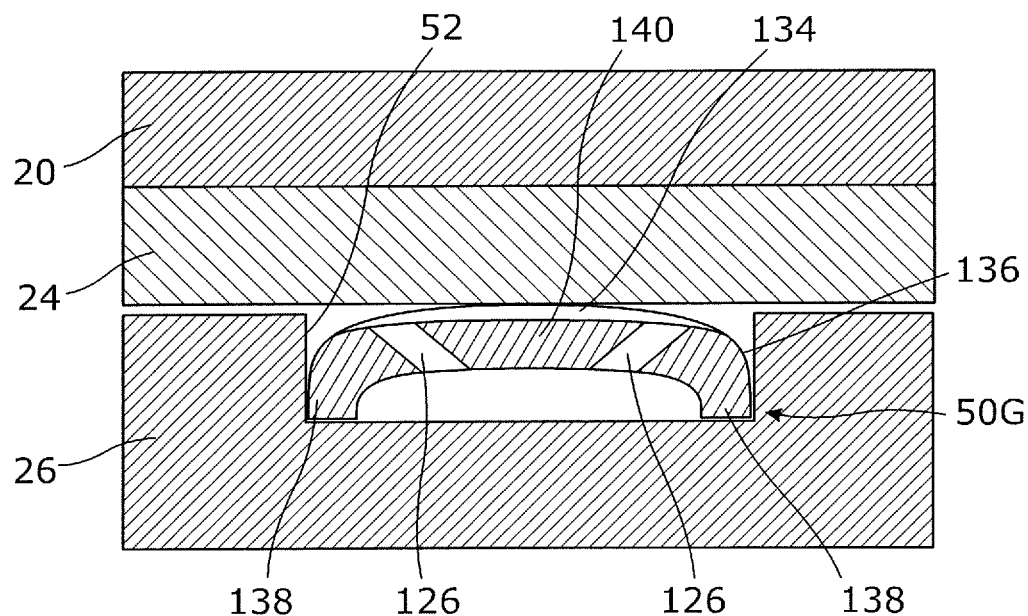

FIG. 4 corresponds to FIG. 3 but shows a variant having double chokes at each end of the connector;

FIG. 5 is a perspective view of an optional cooling head for internal air cooling of the connector during welding;

FIG. 6 is a schematic side view showing the optional use of a tool for inserting the connector into a pipe and for removing the connector from the pipe;

FIG. 7 is a schematic plan view of the insertion/removal tool of FIG. 6, in use;

FIG. 8 is a schematic cross-sectional view of the insertion/removal tool of FIGS. 6 and 7, in use;

FIG. 9 is a side view of an optional external alignment clamp being used to align successive lengths of pipe;

FIG. 10 is a cross-sectional view of the alignment clamp of FIG. 9, in use;

FIG. 11 is a schematic cross-sectional view of a pipe and connector showing the effect of ovality of the pipe;

FIGS. 12*a* to 12*e* are schematic cross-sectional views showing various choke options;

FIGS. 13*a* and 13*b* are schematic cross-sectional views showing a further choke option in use, with different clearances between a lined pipe and a connector; and FIGS. 14*a* and 14*b* are schematic cross-sectional views that correspond to FIGS. 13*a* and 13*b* but show another choke option.

Where the drawings or the following description include dimensions, those dimensions are given for the purpose of context and to aid understanding: they do not limit the scope of the invention.

Figure 1:
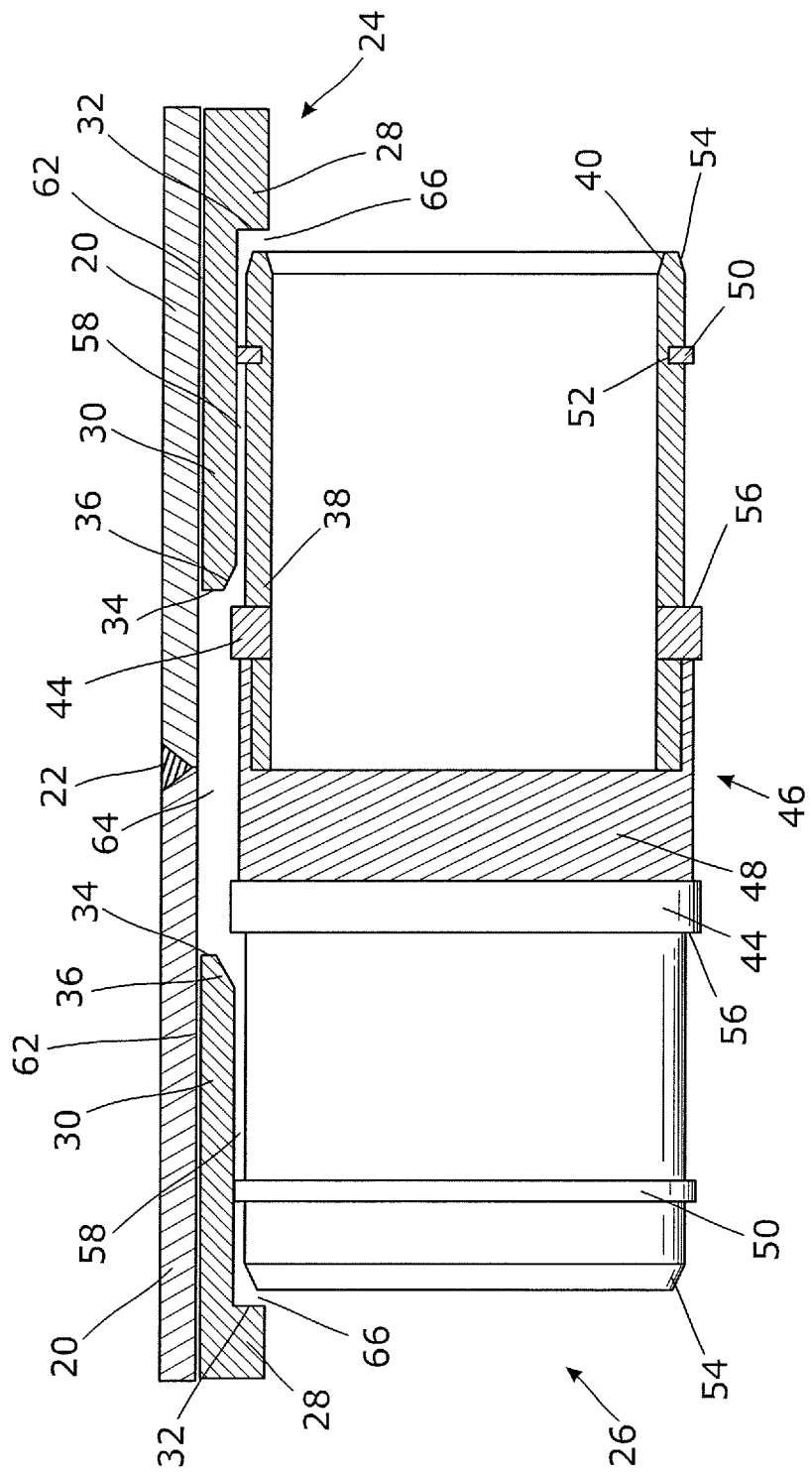
FIG. 1 is a schematic part-sectioned side view of a connector in accordance with the invention, in use engaged with two lined pipes.
Figure 2:
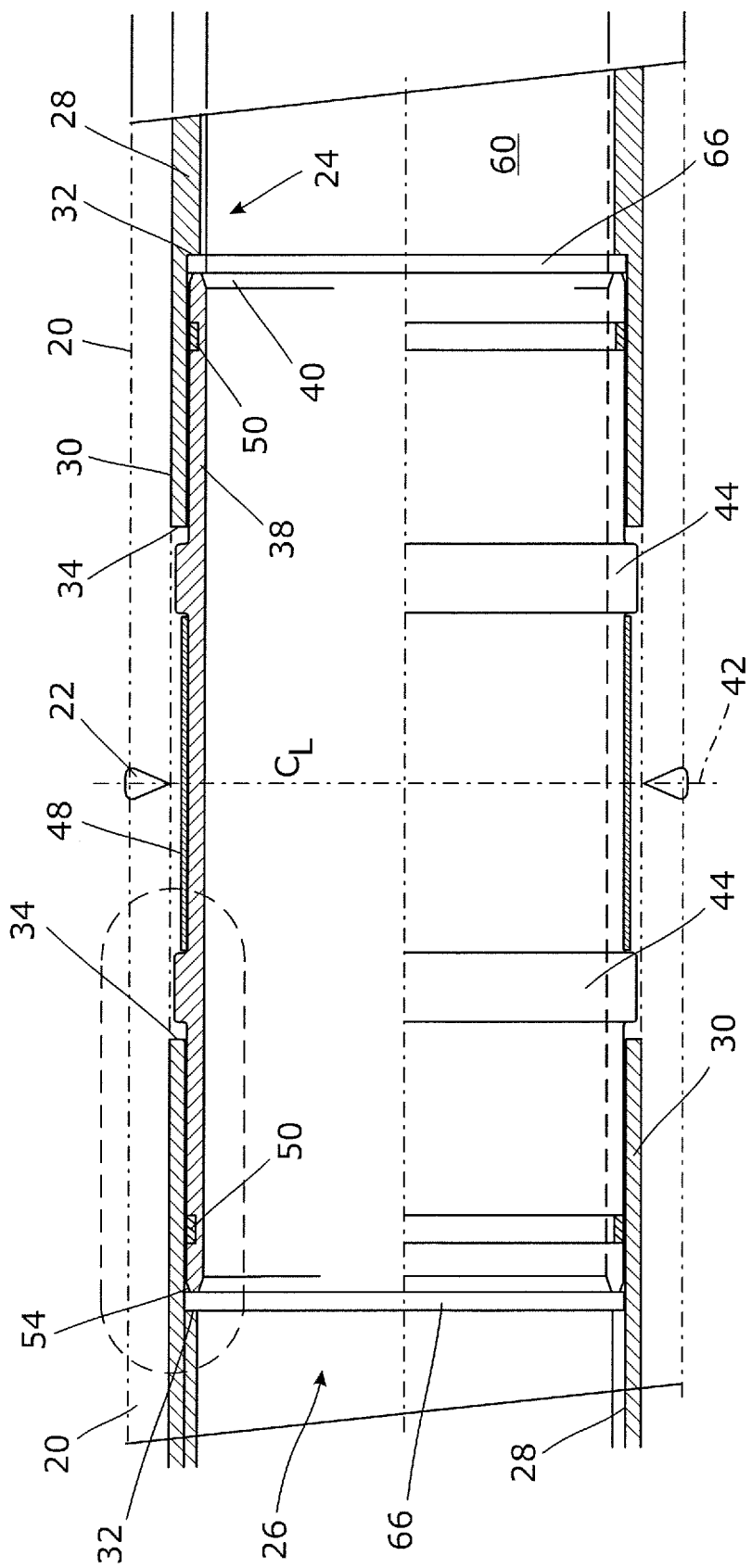
FIG. 2 is longitudinally-sectioned scale view of a connector and pipes corresponding to FIG. 1.

Referring firstly to FIGS. 1 to 3 of the drawings, two lined carbon steel pipes 20 abut end-to-end and are joined by a circumferential weld 22. Only one side of each pipe 20 is shown in the schematic view of FIG. 1 but both sides of the pipes 20 are shown in the scale drawing of FIG. 2. Each pipe 20 comprises a pultruded liner 24 of HDPE 100. The welded-together pipes 20 enclose a generally tubular connector 26 that extends between their liners 24. A section of pipe 20 or pipe joint is typically 11 m in length. The pipe 20 is nominally of circular cross section but will generally have some ovality as will be explained.

The liners 24 have interface formations machined into their opposed ends to mate with inverse interface formations provided on the opposed ends of the connector 26. Specifically, the liners 24 terminate short of an end of the pipe 20 and each liner 24 has a stepped cross-section comprising a full-thickness body portion 28 at which the bore of the pipe 20 is relatively narrow and a reduced-thickness end portion 30 at which the bore of the pipe is relatively wide. In cross-section, the end portion 30 of the liner 24 is arranged concentrically with respect to the body portion 28 of the liner 24 and with respect to the pipe 20.

Each liner 24 therefore has a stepped profile in longitudinal section, defining two annular steps 32, 34. An inner or blocking step 32 defines the junction between the body portion 28 and the end portion 30 of the liner 24. The inner step 32 shown in the simplified view of FIG. 1 lies in a plane orthogonal to the central longitudinal axis of the pipe 20. The inner step 32 and the end portion 30 of the liner 24 are created by boring the liner 24 from the end of the pipe 20. Conversely, an outer or initiation step 34 defines the junction between the end portion 30 of the liner and the section of unlined pipe 20 extending from there to the end of the pipe 20. The outer step 34 is created by machining the liner 24 inside the pipe 20 after post-pultrusion shrinkage of the liner 24 has stabilised, as will be explained below.

The following description will assume that the internal surface of the pipe 20 extending beyond the liner 24 to the end of the pipe 20 is bare and exposed. However, before lining, the interior of the pipe 20 could be spray-coated in a coated zone extending inwardly for say 50 mm to 1000 mm from a weld preparation zone at the end of the pipe 20.

The radially inner edge 36 of the outer step 34 of each liner 24 is shown chamfered in FIG. 1 to ease insertion of the connector 26 into a pipe 20. It is also possible, though not shown in the simplified view of FIG. 1, to chamfer the radially inner edge of the inner step 32 of each liner 24 to reduce turbulence. Chamfering involves additional expense and is optional. It is also possible to radius the radially inner edge of the inner step 32 as best shown in the enlarged detail view of FIG. 3.

Known lining techniques pull a loose-fitting liner into a pipe and lock the liner in place with an Inconel locking ring of wedge-shaped cross-section or a swaged (i.e. corrugated) Inconel cylinder. The Applicant's trials show that pultruding an oversized liner 24 into a pipe 20 (for example a 305 mm OD liner into a 276 mm ID pipe) is possible in one roll-down stage. The liner 24 can then expand elastically within the pipe 20 to lock it into place, although liner creep producing relative axial movement between the liner 24 and the pipe 20 remains a factor as will be explained. The liner 24 reduces access of oxygenated sea water to the inner wall of the pipe 20, hence reducing corrosion of the pipe 20.

It is possible to pultrude a larger liner 24 (for example 315 mm OD) into the same pipe 20 but this may require two roll-down stages, which adds time to the process and would provide no advantage as plastic deformation offsets the elastic memory of the liner 24 to some extent. Roll-down in stages is only useful where a large enough pipe 20 or a small enough liner 24 to allow a single roll-down operation are not available when required.

The oversized liner 24 creates considerable friction with the wall of the pipe 20, quantified as 9 TeF ($9 \times 10^4$N) per axial meter pulling force and greater than 40 TeF ($4 \times 10^5$N) per axial meter pushing force in a 12" (305 mm) OD pipe. In practice, it is the greater pushing force that must be overcome because there is no mechanism to engage the liner 24 and pull it in the normal operating environment within the pipe 20.

The high axial friction force means that metal locking rings are not required for the liner 24. However, this does not mean that the liner 24 will remain fixed relative to the pipe 20 once it has been installed. Within two hours of pultrusion into a pipe 20, the ends of the liner 24—which would generally be left proud of the pipe 20—shrink by centimeters and will creep by further centimeters over the next few weeks. It is therefore advisable not to machine the ends of the liner 24 until a period of at least two weeks, and preferably at least four weeks, have elapsed after pultrusion. However that period could be shortened by heat treatment, involving blowing hot air or passing hot water down the lined pipe 20.

The liner 24 will creep by centimeters more at each end due to stress relief during the bending and straightening processes involved in deployment of a pipeline from a pipe-laying vessel. The length of the stepped end portion of the liner 24 must be sufficient to compensate for liner creep; the connector 26 illustrated in FIGS. 1 to 3 must also allow for this with the length of its inverse interface step.

The connector 26 aims to mitigate corrosion with a continuous variable-length barrier that handles axial shrinkage and creep of the liner 24 while providing continuity of lining across the pipe weld 22 between two adjoining lengths of pipe 20. The connector 26 must have the thermal robustness necessary to survive the pipe welding process. The connector 26 may be made of a choice of composite materials and plastics, with the option to be made of a different material to the liner 24. However, the exemplary connector 26 illustrated and described in this specification is made of the same material as the liner 24. The thermal insulation properties of the connector 26 are comparable to those of the liner 24.

The connector 26 comprises an elongate tube 38 that is machined or moulded from a polymer, HDPE 100. Internally, the tube 38 is plain and parallel-walled apart from turbulence-reducing internal chamfers 40 around the ends of the tube 38. Externally, the tube 38 has various features disposed symmetrically about a central plane 42 orthogonal to the central longitudinal axis of the tube 38, that plane 42 being substantially aligned with the weld 22 when the connector 26 is in situ as shown in FIG. 2. Those external features are:

- 'shoulder' formations defined by circumferential integral hoop-reinforcement bands 44 extending around the tube 38, the bands 44 being parallel to and spaced from each other about the central plane 42 of the connector 26 to define an insulator recess 46 between them;
- an insulator strip 48 laid on the outside of the tube 38, extending across the insulator recess 46 between the bands 44 and thus being aligned with the weld 22 when the connector 26 is in situ;
- identical circumferential chokes 50 projecting radially from circumferential grooves 52 extending continuously around the tube 38 near its ends, for example about 30 mm in from the outer ends of the connector 26; and
- external lead-in chamfers 54 around the ends of the tube 38.

Whilst grooves 52 are shown to locate the chokes 50 in this example, it would also be possible to locate a choke 50 on the connector 26 with a locking ring.

In general, 15° chamfering of all corners that might cause turbulence or impede insertion of the connector 26 into, and extraction of the connector 26 from, the lined pipe 20 is preferred. Similarly, corners of the connector 26 and the liner 24 are preferably radiused for the purpose of stress relief. For example, the bands 44 shown in the simplified schematic view of FIG. 1 have shoulders 56 that extend from the tube in planes orthogonal to the central longitudinal axis of the tube 38. However, in practice as shown in the scale views of FIGS. 2 and 3, substantial radii should be applied to the base of the bands 44 for stress relief because the central part of the tube 38 between the bands 44 behaves as a cylindrical diaphragm in use. Similarly, wall thickness should be maximised around the central part of the tube 38 to reduce strain on the ends of the insulator recess 46

The length of the insulator recess 46 of the connector 26, corresponding to the width of the insulator strip 48, is approximately 200 mm axially for a 12" (305 mm) OD pipe 20. The insulator strip 48 used for testing purposes comprises a microgel insulator approximately 2 mm thick, for example an Aerogel or Pyrogel (trade marks) supplied by Aspen or a Nanogel (trade mark) supplied by Cabot Corporation. This insulator is backed by Argweld (trade mark) backing tape supplied by Huntingdon Fusion Techniques Limited, both being held around the central part of the tube 38 with aluminium tape of, for example, 50 mm to 75 mm in width. The aluminium tape may include a central thread marker to align the insulated centre of the connector 26 with the root of the weld 22. Other insulator materials and constructions are possible. It is emphasised that the dimensions given above are merely by way of example; they are likely to be minimum dimensions but this remains to be confirmed by testing.

The chokes 50 comprise an elastomer and various embodiments of them will be described in more detail later, with reference to FIGS. 12a to 12e, 13a, 13b, 14a and 14b.

FIGS. 1 and 2 show that the ends of the tube 38 lie between the opposed inner steps 32 of the liners 24. To recap, those inner steps 32 are between the full-thickness body portions 28 of the liners 24 and their reduced-thickness end portions 30. The external diameter of the tube 38 is slightly less than the internal diameter of the end portions 30 of the liners 24, the resulting clearance defining annular channels 58 between the tube 38 and the respective end portions 30. Nominally, the depth of each channel 58 defined by the clearance between the tube 38 and the respective end portions 30 of the liners 24 is typically of the order of 1 mm. However the clearance could be less, potentially zero at some locations, if the connector 26 is inserted with a pneumatic or hydraulic tool.

Each channel 58 forms part of a fluid flow path extending from the bore 60 of the pipeline to the micro-annuli 62 between the liners 24 and the pipes 20, via the exterior of the connector tube 38 and the annulus 64 defined by the gap between the liners 24 where the pipes 20 adjacent the weld 22 are exposed. A gap 66 of circa 10 mm between each end of the tube 38 and the opposed inner step 32 accommodates tolerances in the assembly and communicates with a respective channel 58 to complete the fluid flow path.

The fluid flow paths equalise pressure of the annulus 64 and the micro-annuli 62 with the bore 60 of the pipeline and so prevent the liner 24 or the connector 26 collapsing due to differential pressure in use of the pipeline. Equalisation will work at any orientation of roll, pitch or yaw of the pipeline. This process of pressure transfer is required to prevent the connector 26 and the liner 24 from deforming if overpressure in the annulus 64 and the micro-annuli 62 exceeds approximately 0.5 bar. In tests in which equalisation was prevented, deflection of the insulator recess 46 between the circumferential bands 44 of the connector 26 was noted at an overpressure 0.5 bar and this developed into severe bulging at 0.9 bar. Complete collapse occurred at an overpressure of approximately 1.5 bar.

Fluid flow through each channel 58 is restricted by a choke 50 that bears resiliently and radially outwardly from the tube 38 against the opposed end portion 30 of the liner 24 to restrict—but not prevent—fluid flow along the fluid flow paths as will be explained. Pressure equalisation is required before a damaging overpressure condition arises but only limited two-way flow is allowed between the micro-annuli 62, the annulus 64 and the bore 60 of the pipeline. Thus, the chokes 50 are porous and permeable to allow pressure equalisation but they prevent large-volume flow at low differential pressure, although they may be designed to collapse to permit high-volume flow at high differential pressure as will be explained with reference to FIGS. 12a to 12e.

Having regard to the depth of the channels 58 between the tube 38 and the end portions 30 of the liners 24, the wall thickness of the tube 38 is correspondingly less than the height of the inner steps 32. This means that the internal surface of the tube 38 substantially aligns with the internal surfaces of the body portions 28 of the liners 24. Alignment between the internal surfaces of the connector 26 and the lined pipes 20 reduces turbulence within the pipeline in use, and also facilitates pigging of the pipeline. However, alignment need not be exact, as pigs can tolerate a minor misalignment of the bores of the liner 24 and the connector 26. Indeed, a standard pig can be used, helped by the connector 26 being approximately the same internal diameter as the lined pipe section, the narrow gaps 66 between the connector 26 and the lined pipe section, and the chamfered, tapering entry and exit of the connector 26.

The pair of bands 44 extending around the tube 38 provide some hoop stress reinforcement to the tube 38. In situ, they lie between, and usually slightly spaced from, the opposed spaced ends of the liners 24 defined by their outer steps 34. The external diameter of the bands 44 is greater than the internal diameter of the end portions 30 of the liners 24, but is less than the internal diameter of the pipes 20 exposed between the liners 24 to either side of the weld 22.

There is no need for a band 44 to touch the exposed section of pipe 20 once the connector 26 is fully inserted into a pipe 20, as the bands 44 play no part at that stage in centralising the connector 26 within the pipe 20. The bands 44 may, however, contribute to coarse centralising on initial insertion of the connector 26 into the pipe 20. They also help to protect the insulator strip 48 and the chokes 50 from sharp edges, dust, debris and mill scale that typically arise from weld profile preparation of steel pipes.

Indeed, some radial clearance between the bands 44 and the pipes 20 is preferred so that there is no risk of obstruction with the pipe wall on heavily ovalised pipe, and also to hinder heat transfer from the pipes 20 to the connector 26 during welding. Also, the bands 44 may jam under the root of the weld 22 if they are too closely matched to the internal diameter of the pipes 20, although this is only a problem if the connector 26 ever has to be extracted from the pipeline during repairs.

A key purpose of the bands 44 is to restrict relative axial movement between the connector 26 and the liners 24. If there is substantial relative axial movement between the connector 26 and a liner 24, a shoulder 56 defined by one of the bands 44 will bear against the outer step 34 of the liner 24 to prevent further relative axial movement in that direction. Otherwise, such movement could close the gap 66 between the end of the tube 38 and the inner step 32 of the liner 24 and hence block the fluid flow path. However even in that event, the gap 66 at the other end of the tube 38 would be expected to remain open to maintain an alternative fluid flow path to assure equalisation.

Further redundancy is assured by the provision of two chokes 50 on the connector 26 in the event of blockage at one end of the connector 26, for example due to silt. The connector 26 need only have a single choke 50 at each end although it could have additional chokes. For example, double chokes 50 at each end of the connector 26, as shown in the variant of FIG. 4, would provide redundancy but would halve the potential flow for a given permeability of choke, unless the permeability of each choke 50 was doubled. Also, the interface step where projecting portions of the tube 38 extend axially beyond the bands 44 to the ends of the connector 26 may have to be extended to accommodate additional chokes 50, although this is not shown in FIG. 4.

It will be apparent from FIGS. 1 to 4 how the interface formations of the opposed liners 24 comprise female interface elements that mate telescopically with male interface elements defined by the inverse interface formations of the connector 26. This allows for liner creep while the bands 44 prevent excessive axial shuttle movement of the connector 26 between the liners 24. For this purpose, there is a substantial male-female overlap between the connector 26 and each liner 24 at the interface, specifically at the projecting portions of the tube 38 where the tube 38 extends axially outwardly beyond the bands 44 to the chokes 50 and from there to the ends of the connector 26. The majority of each projecting portion of the tube 38 lies within a correspondingly-elongated end portion of the liner 24. This allows for extensive relative axial movement between the connector 26 and the liners 24 while maintaining channels 58 between the tube 38 and the liners 24 and keeping the chokes 50 in resilient sliding contact with the liners 24. Thus, the connector 26 compensates for manufacturing ovality of the pipes 20, which in turn distorts the liner 24; it also compensates for radial distortion of the pipes 20 during bending and straightening in the lay process, and for relative axial movement of the liners 24 with respect to the pipes 20.

The length of the overlap between the connector 26 and the liners 24 must take account of axial shrinkage and creep of the liners 24 throughout the lifetime of the pipeline. Consequently a minimum overlap at each end of the connector 26 of 160 mm (200 mm maximum) is envisaged for pipes 20 of 12" (305 mm) diameter. The length of this overlap depends on the diameter of the liner 24, its thickness and the relative diameters of the pipe 20 and the liner 24.

Thus, the liner interface mates with the inverse interface of the connector 26 to provide interfacing surfaces for the chokes 50. The interface step centres the connector 26 in the lined pipes 20. The bands 44 of the interface also provide two end stops to restrict shuttle motion of the connector 26 while still enabling the connector 26 to maintain contact with the liners 24 via the chokes 50.

In use when assembling a pipeline, the connector 26 is inserted into the end of a pipe 20 prepared as shown in FIGS. 1 and 2, with half of the connector 26 protruding from the pipe 20. It is proposed that the best place to insert the connector 26 is when the pipe 20 is in a 'ready rack' after a bevelling station. This maintains environmental protection of the connector 26, which may remain packaged up to that point, and allows a period of about twenty minutes to unpack and load the connector 26 and to dispose of its packaging. Then, a second similarly-prepared pipe 20 is brought together into end-to-end abutment with the first pipe 20 while surrounding and locating the connector 26 as shown in FIGS. 1 and 2. Finally the pipes 20 are welded together after any necessary further preparation.

During weld preparation and during the welding process itself, the insulator strip 48 protects the connector 26 beneath from radiant heat from the weld 22. The connector 26 can survive manual and automatic welding at any angle of pipe 20. The insulator strip 48 must be below the root of the weld 22 and is preferably centralised with respect to the weld root. However if the insulator strip 48 is offset with respect to the weld root, the edge of the insulator strip 48 should preferably overlap by at least 5 mm beyond the root gap.

To protect the HDPE material of the connector 26 below the insulator strip 48 in close proximity to the weld 22 and also beyond the protection of the insulator strip 48, the root of the weld 22 should not touch the outer surface of the insulator strip 48: a standoff distance of >3 mm would assist the thermal survival of the HDPE. To this end, the connector 26 should not touch the inner wall of the pipes 20 as noted above, not even at the circumferential bands 44. The liners 24 take the first of the thermal shock of welding by conduction from the pipes 20.

During early welding trials involving the invention, thermocouples (not shown) were placed at various points on the outside surface of the connector 26 and at approximately corresponding points on the inside of the connector 26. In addition, temperature readings were taken at corresponding positions axially spaced from the weld 22 on the outer surface of the pipes 20 so that the temperature at each point in this cross-sectional matrix could be monitored and compared. After several test welds, it could be concluded that—for a particular lined pipe configuration—the connector 26 will not be thermally damaged by heat saturation if a temperature limit of, say, no more than 280 Celsius is observed on the outer surface of the pipes 20 more than 25 mm from the weld toe. Thus, it is possible to model the thermal response of the system and then to infer from a simple external temperature measurement of a pipe 20 that the temperature experienced by the connector 26 is within desired limits, without having to measure the temperature of the connector 26 directly. If the threshold external temperature is in danger of being breached, key welding variables may be changed accordingly. It is also possible to apply and/or to modify internal cooling within the pipes 20 to control the temperature of the connector 26.

It is possible to avoid cooling the connector 26 during the welding process with careful selection of welding variables. However, internal cooling of the connector 26 may be advantageous as this allows faster welding while keeping the temperature of the HDPE material well below its softening temperature. Initial trials suggest that greater internal cooling is appropriate during manual TIG welding than during auto MIG welding.

FIG. 5 of the drawings shows a cooling head 68 that may, if desired, be used for internal air cooling of the connector during welding. The cooling head takes air at nominally 4 to 8 bar (i.e. suitable for rig service air) through a pneumatic quick-connect coupling 70 and blasts that air laterally through nozzles 72 facing radially outwardly, against the interior of the connector 26 in approximate alignment with the weld 22. Spaced parallel centraliser plates 74 of the cooling head 68 fit closely within the connector 26 to support the nozzles 72 around the central longitudinal axis of the connector 26.

In tests, internal air cooling using the cooling head 68 in conjunction with auto MIG and manual TIG welding was effective in reducing the temperature of the connector 26 in all cases and configurations. The results show that with limited heat management optimisation to maintain the external temperature of the pipes 20 more than 25 mm from the weld toe at less than 280 Celsius, the connector 26 will survive welding without distortion. Monitoring the region of the weld toe with a thermocouple or non-contact IR thermometer to ensure a maximum external pipe temperature of 280 Celsius can be used to infer the maximum temperature being experienced by the connector 26 and hence to the guide the whole welding and/or cooling process. Of course, this guide temperature is merely an example and can be determined for any pipe/liner configuration.

Internal air cooling has been found to bring the temperature of the connector 26 down from 110 Celsius to below 50 Celsius, thus more than halving the temperature experienced by the HDPE material. In this way, it has been found possible to weld a 12" (305 mm) OD pipe with auto MIG welding while experiencing a temperature of under 50 Celsius at the midpoint on the connector 26 with cooling in twenty minutes when all the welding passes are undertaken serially at one station.

Moving on now to FIGS. 6 to 8 of the drawings, these show a powered insertion tool 76 to grip and insert the connector 26 into a lined pipe 20 and subsequently to extract the connector 26 from the pipe 20 should there be a problem. The insertion tool 76 comprises a frame 78 that may be suspended by a lifting point 80, claws 82 pivotally attached to the frame 78 by respective claw axles 84 parallel to the central longitudinal axis of the pipe 20, and a pneumatic or hydraulic claw ram 86 acting on the claws 82 to close them about the pipe 20. The claws 82 grip the exterior of the pipe 20 to lock the frame 78 relative to the pipe 20.

The frame 78 supports parallel slider tubes 88 that, in turn, support a cursor 90 that bridges the slider tubes 88 and is movable along the slider tubes 88 in a direction parallel to the central longitudinal axis of the pipe 20. A pneumatic or hydraulic ram 92 acts between the frame 78 and the cursor 90 to drive the movement of the cursor 90 along the slider tubes 88.

Arms 94 depend from the cursor 90 to embrace an end of the connector 26. When inserting the connector 26, the arms 94 bear against a 'top hat' flanged insert 96 of HDPE that is positioned between the arms 94 and the connector 26 to prevent damage to the connector 26. The ram 92 pulls the cursor 90 and hence the connector 26 toward the pipe 20 to insert the connector 26 up to its mid point in the end of the pipe 20.

The same tool 76 can be used in a reverse stroke if it is necessary to extract the connector 26 from the pipe 20. In that case, movable or removable fingers 98 on the arms 94 to each side of the cursor 90 are hooked behind a circumferential shoulder band 44 of the connector 26. The ram 92 can then push the cursor 90 and hence the connector 26 away from the pipe 20 to extract the connector 26.

Another option to extract the connector 26 is simply to use a winch (not shown). For example, a hole may be drilled through diametrically-opposed walls of the connector 26, whereupon a pin may be pushed through the holes and attached to a winch that pulls the connector 26 out of the pipe 20. Obviously this technique would lead to the connector 26 being scrapped but this would generally be the fate of a connector that has to be removed in any event.

FIGS. 9 and 10 of the drawings show an external alignment clamp 100, as the inside of the lined pipe 20 is too soft to apply large radial alignment forces to the pipe 20 with a traditional internal alignment clamp. An external alignment clamp could be incorporated into the insertion/extraction tool 76 of FIGS. 6 to 8 but the basic tool shown in FIGS. 9 and 10 is simpler and yet effective.

The alignment clamp 100 comprises a circumferential hoop 102 divided into two semi-circular sections hinged together, that can be opened about the hinge 104 to admit a second pipe 20' and then closed around the second pipe 20', close to its end, and held together by a latch 106 diametrically opposed to the hinge 104.

Three alignment blocks 108 are equi-angularly spaced around the hoop 102. They present inner faces to the second pipe 20' that lie parallel to its central longitudinal axis and that overlap its end. Each alignment block 108 has a tapered front 110 inclined outwardly and forwardly to assist alignment of the second pipe 20' with a first pipe 20 as shown in FIG. 9.

The effect of ovality of a pipe 20 is apparent in the exaggerated schematic view of FIG. 11 of the drawings. Here, the pipe 20 is flattened from top to bottom as shown. This results in two annuli that vary in section depending on the angular position around the central longitudinal axis of the pipe 20. The first annulus is the micro-annulus 62 between the pipe 20 and the liner 24, which is squeezed to a minimum at the top and bottom of the cross-section and flares to a maximum at the sides. Similarly, the liner 24 is flattened from top to bottom of the cross section as shown and this affects the second annulus, namely the clearance defining the channel 58 between the projecting male portion of the tube 38 and the surrounding female end portion of the liner 24

Specifically, the clearance is reduced to a minimum (practically zero) at the top and bottom quadrants and increases to a maximum (potentially 4 mm for a 12" (305 mm) pipe) at the side quadrants, but the choke 50 contracts radially at top and bottom and expands radially at the sides to accommodate these differences. Meanwhile, an effective fluid flow path is maintained through the choke 50 around the sides of the tube 38 to ensure equalisation, even if the path is blocked at the top and bottom.

The aggregate cross-sectional area of the channel 58 between the tube 38 of the connector 26 and the surrounding end portion 30 of the liner 24 varies with ovalisation. However it can be shown that even in an extreme case where the channel 58 is 4 mm wide at its widest and 0 mm wide at its narrowest, the aggregate cross-sectional area of the channel 58 increases by a factor of less than 1.5 over a non-ovalised channel 58 whose width is consistently 0.5 mm around the circumference. This ensures reasonably consistent behaviour of a choke 50 disposed in the channel 58.

O-ring seals between the telescoping parts of the liner 24 and the connector 26 would not work in this situation as they do not have the dynamic range necessary to compensate for ovalisation. By way of explanation, o-ring seals as proposed in the aforementioned WO 2004/011840, which are typically of nitrile rubber, have a compressibility of no more than about 25%. This restricts their dynamic radial range. The larger the section of the o-rings, the greater their dynamic radial range in absolute terms. However the section of the o-ring is limited by practical considerations, for example by the axial force needed to insert the connector into a lined pipe. O-rings of greater than circa 6.3 mm cross-section are considered impractical and their dynamic radial range will be barely 1.5 mm, hence rendering them incapable of handling the degree of ovality typically experienced in real pipelines.

Similarly, it would not be possible to rely solely upon a close sliding or interference fit between the telescoping parts of the liner 24 and the connector 26 to control the fluid flow around the connector 26. That solution would suffer from the risk that ovalisation would disrupt the fit, with clearance being too small in some places to allow the parts to move past one another or too large in other places to restrict the fluid flow as desired.

Thus, turning now to FIGS. 12a to 12e of the drawings, these show various possible choke arrangements 50A to 50E respectively in accordance with the invention. Those variants demonstrate how to control fluid flow between the pipe bore 60 and the micro-annulus 62 with isobaric, symmetrical or asymmetrical reciprocal pressure transmission across a choke. They also show how the permeability and pressure response of a choke may be modified with different dispositions and combinations of porous materials and barriers.

In normal circumstances, a choke must restrict movement of corrosive fluid such as oxygenated sea water to minimise the corrosive effect of that fluid on the inner wall of the steel pipe 20. By restricting that movement, oxygen depletion upon initial corrosive oxidation of the pipe wall will reduce the corrosive effect of the fluid and hence slow further corrosion. In other words, minimal flow between the wall of the pipe 20 and the pipe bore 60 will reduce the rate at which corrosive oxidiser is replenished and hence will reduce the corrosive effect of that oxidiser. Yet, it is also important that if pressure in the pipe bore 60 drops suddenly, then liquid in the micro-annulus 62 between the liner 24 and the pipe 20 and in the annulus 64 encircling the connector 26 can flow quickly into the bore 60 to equalise pressure and so to prevent collapse of the liner 24 or the connector 26.

In all cases, the resilient radial extensibility of the choke—its dynamic radial range—allows for the varying clearance between the liner 24 and the connector 26, which—as FIG. 11 shows—varies with angular position about the central longitudinal axis of the pipe 20 in accordance with the degree of pipe ovalisation before and during the lay process, and may indeed continue to vary with creep of the liner 24 and movement of the connector 26 in use of the pipeline. The choke must therefore continue to compensate for such changes in geometry throughout the working life of the pipeline. The permeability of the choke should be set such that the minimum acceptable flow is set by the lowest exposed cross-sectional area of the choke and the maximum allowable flow should be set by the largest exposed cross-sectional area of the choke encountered upon maximum ovalisation of the pipe 20.

An aim of the choke variants 50A to 50E shown in FIGS. 12a to 12e respectively is therefore to provide a large dynamic radial range to compensate for the ovality seen in FIG. 11. Such chokes may, for example, provide a dynamic radial range of approximately 6 mm outside the confines of its groove 52, which may in turn be approximately 4 mm deep. Thus, the choke will require radial compressibility of approximately 60% while continuing to bear radially outwardly against the liner 24, which is possible with careful selection of porosity and substrate hardness.

FIGS. 12a, 12b and 12c show choke variants 50A to 50C respectively in which porous, permeable choke material 112 such as resilient foam is supported in a holder 114 comprising a base web 116 and resilient retaining walls 118 extending upwardly and integrally from the base web 116. The choke 50A shown in FIG. 12a has a triangular-section length of choke material 112 whose apex ridge 120 faces away from the base web 116 and whose base is retained by inwardly-inclined retaining walls 118. Similar retaining walls 118 are a feature of the base web of the choke 50B shown in FIG. 12b, the distinction here being that the length of choke material 112 protruding from the holder 114 does not taper to an apex ridge but instead is parallel-sided and terminates in a rounded upper surface 122. The length of choke material 112 protruding from the holder of the choke 50C shown in FIG. 12c is similarly parallel-sided and terminates in a rounded upper surface 122, but in that case the retaining walls of the base web 116 are mirror-image C-sections.

The basis of the further choke variants 50D and 50E shown in FIGS. 12d and 12e respectively is an acutely-angled 'V' shaped profile comprising a resilient inclined barrier web 124 upstanding from and integral with a base web 116. The barrier web 124 is penetrated by openings such as cuts or perforations so as to act as a choke. An array of holes 126 is shown in the barrier web 124 of FIGS. 12d and 12e; slits are possible alternative openings.

In the choke 50E of FIG. 12e, the barrier web 124 partially encloses a triangular-section length of porous, permeable choke material 112 such as resilient foam disposed between the barrier web 124 and the base web 116. The choke 50E of FIG. 12e is therefore of composite construction having a relatively stiff permeable spine that supports, and is disposed in series with, the relatively flexible choke material 112. The relative stiffness of the barrier web 124 and the choke material 112 may be varied to obtain desired properties of deflection, pressure response and resilience. The relative permeability of the barrier web 124 and the choke material 112 may also be varied to tailor the permeability of the choke 50E as a whole, for example by providing a less permeable barrier web 124 that makes the choke 50E more restrictive than a choke of similar shape and thickness made from foam alone.

The choke variants 50A to 50E shown in FIGS. 12a to 12e share characteristics that are highly beneficial in the context of lined pipelines. For example, the cross-sectional area of a circumferential choke 50 is massively greater than the cross-sectional area of a 'Linavent' vent such as is proposed in WO 2004/011840. This provides a much wider, less constricted and less easily-blocked flow path for the rapid escape under high pressure of any liquid accumulated in the micro-annulus 62 between the liner 24 and the pipe 20 and in the annulus 64 around the connector 26. The ability to equalise pressure rapidly is enhanced by the ability of the choke 50 to deform under high differential pressure, effectively to collapse away from the liner 24 above a threshold differential pressure to allow bypass flow of liquid around the choke 50, through the resulting gap between the liner 24 and the choke 50. Thus, the material and the structure of the choke 50 confers a low modulus of elasticity on the choke 50. Yet, at low differential pressure, the choke 50 bears reliably against the liner 24, regardless of ovalisation, to permit minimal controlled flow that will equalise minor or low-frequency pressure fluctuations without undermining corrosion protection.

The inclination of the barrier web 124 evident in the choke variants 50D and 50E of FIGS. 12d and 12e also lends directional qualities to the choke, which may be tailored provided that the choke remains flexible enough to be attached to the connector 26 and then to allow the connector 26 to be inserted into the lined pipe 20. So, a barrier web 124 inclined to the left as shown in the chokes 50D and 50E of FIGS. 12d and 12e has an asymmetric response to differential pressure across the choke, presenting a different response to pressure exerted from the right side of the choke, as shown, than to the same pressure exerted from the left side of the choke, as shown. In particular, if the micro-annulus 62 between the liner 24 and the pipe 20 is disposed to the right of the choke 50D and 50E as shown in FIGS. 12*d* and 12*e*, then liquid will enter the micro-annulus 62 less freely than it can exit the micro-annulus 62. It will be noted in this respect that the inclination of the barrier web 124 as shown is such as to enable substantial flow of liquid from the right, where at high differential pressure the barrier web 124 may bend away from the liner 24 to create a bypass path. Conversely, the inclination of the barrier web 124 is such as to resist substantial flow of liquid from the left. In that case, the barrier web 124 would be forced against the liner 24 to ensure that liquid cannot bypass the choke 50D and 50E even at high differential pressure but must instead flow through the choke 50D and 50E. The rate at which liquid flows through the choke 50D and 50E will then depend on the permeability of the choke 50D and 50E and the differential pressure to which the choke 50D and 50E is subjected.

FIGS. 13*a* and 13*b* and FIGS. 14*a* and 14*b* illustrate further choke variants 50F and 50G respectively. Like numerals are used for like parts. Each choke 50F and 50G is shown in situ in a groove 52 around a tube 38 of a connector 26. Again, these chokes 50F and 50G have a large dynamic radial range that allows for varying clearance between the liner 24 and the connector 26, for example with angular position about the central longitudinal axis of the pipe 20 as arises with ovality. And again, various measures are possible to tailor the response of the chokes 50F and 50G to differential pressure, such as adjusting stiffness and permeability.

FIGS. 13*a* and 13*b* and FIGS. 14*a* and 14*b* illustrate the extremes of the dynamic radial range but are not to scale. FIGS. 13*a* and 14*a* show a near-maximum clearance between the liner 24 of a pipe 20 and the connector 26, with the chokes 50F and 50G biased radially outwardly against the liner 24 in a resiliently-extended state. Conversely, FIGS. 13*b* and 14*b* show a near-minimum clearance between the liner 24 and the connector 26, with the chokes 50F and 50G collapsed under radially-inward pressure from the liner 24 against their resilient bias.

Referring specifically now to FIGS. 13*a* and 13*b* and particularly to the choke 50F when in the extended state shown in FIG. 13*a*, the choke 50F in that extended state has an acutely-angled 'V' shaped profile comprising a resilient inclined barrier web 124 upstanding from and integral with a base web 116. The barrier web 124 and the base web 116 are both generally planar and there is an acute angle between them, such that the barrier web 124 extends over the base web 116. The base web 116 is slightly narrower than the width of the groove 52 and is offset to one side of the groove 52, leaving a gap 128 at one end.

An apex portion 130 at the radially-outer free edge of the barrier web 124 is enlarged and rounded in cross section where it bears against the liner 24. The convex outer surface of the apex portion 130 allows the barrier web 124 to deflect more easily under differential pressure from either side than the sharper-edged choke variants 50D or 50E of FIGS. 12*d* and 12*e*.

As the clearance between the liner 24 and the connector 26 reduces, the angle between the barrier web 124 and the base web 116 narrows due to angular movement of the barrier web 124 about the junction 132 between them. Rolling and sliding movement of the apex portion 130 with respect to the liner 24 accommodates this changing geometry while the barrier web 124 continues to bear radially outwardly against the liner 24.

Eventually as the clearance between the liner 24 and the connector 26 approaches a minimum, the choke 50F assumes the collapsed state shown in FIG. 13*b*. Here, the barrier web 124 has pivoted radially inwardly about its junction 132 with the base web 116 to lie substantially parallel to the base web 116. The enlarged apex portion 130 of the barrier web 124 is then accommodated within the gap 128 left by the offset position of the base web 116 in the groove 52.

The barrier web 124 is penetrated by a line of holes 126 so as to act as a choke. Some or all of the holes 126 could be filled by a porous material (not shown) that restricts flow while maintaining some permeability. The permeability of the porous material may be adjusted or varied, and could vary from hole to hole. Again, slits are possible alternative openings.

The choke 50F shown in FIGS. 13*a* and 13*b* also has an array of microgrooves 134 extending generally in the flow direction. In this example, the microgrooves 134 extend over and around the apex portion 130 of the barrier web 124 to create a bypass path around the barrier web 124 when the choke 50F is in the extended state. This optional feature uses the microgrooves 134 to tailor the permeability of the choke 50F; the number and width of the microgrooves may of course be varied to achieve whatever characteristics may be desired. As the microgrooves 134 extend around the convex-curved apex portion 130 of the barrier web 124, they maintain an effective bypass path when the choke 50F is in the extended state, irrespective of the clearance between the liner 24 and the connector 26 and hence the inclination of the barrier web 124.

In the example shown in FIGS. 13*a* and 13*b*, the microgrooves 134 span the width of the barrier web 124 from the junction 132 to the apex portion 130, so as to maintain an effective bypass path when the choke 50F is in the collapsed state as shown in FIG. 13*b* with minimal clearance between the liner 24 and the connector 26.

Microgrooves 134 may extend either around the apex portion 130 or across the barrier web 124, or as shown in FIGS. 13*a* and 13*b* they may extend both around the apex portion 130 and across the barrier web 124.

Referring finally to the choke 50G shown in FIGS. 14*a* and 14*b*, this comprises a resilient moulding 136 of arcuate cross-section that is substantially symmetrical about a central radial plane. The cross-section of the moulding 136 is part-elliptical in this example when in the extended state shown in FIG. 14*a*, with mirror-image webs 138 extending radially outwardly from the base of the groove 52 in the connector 26 and converging to join at a central radially-outer apex portion 140. The width of the moulding 136 defined between the radially-inner bases of the webs 138 is offset to one side of the groove 52, leaving a gap 128 at one end.

The apex portion 140 of the moulding 136 is rounded in cross-section where it bears resiliently against the inner surface of the liner 24. The convex outer surface of the apex portion 140 helps the moulding 136 to deflect under differential pressure from either side and also to slide with respect to the liner 24 if clearance varies between the liner 24 and the connector 26.

As the clearance between the liner 24 and the connector 26 reduces, the cross-section of the moulding 136 flattens as the angle between the webs 138 widens due to angular movement about the apex portion 140 between them. The width of the moulding 136 between the radially-inner bases of the webs 138 increases as the radial thickness of the moulding 136 decreases.

Eventually as the clearance between the liner 24 and the connector 26 approaches a minimum, the choke 50G assumes the collapsed state shown in FIG. 14*b*. Here, the apex portion 140 lies flattened between the webs 138 and the moulding 136 has spread across the gap 128 to fill the width of the groove 52.

Each web 138 of the moulding 136 is penetrated by a line of holes 126 so as to act as a choke. Some or all of the holes 126 could be filled by a porous material (not shown) that restricts flow while maintaining some permeability. The permeability of the porous material may be adjusted or varied, and could vary from hole to hole or from web to web. Again, slits are possible alternative openings.

The choke 50G shown in FIGS. 14a and 14b also has an array of microgrooves 134 extending generally in the flow direction. In this example, the microgrooves 134 extend over and around the apex portion 140 of the moulding 136 to create a bypass path around the moulding 136 when the choke 50G is in the extended state. Again, this optional feature uses the microgrooves 134 to tailor the permeability of the choke 50G and the number and width of the microgrooves may be varied to achieve desired characteristics. As the microgrooves 134 extend around the convex-curved apex portion 140 of the moulding 136, they maintain an effective bypass path when the choke 50G is in the extended state, irrespective of the clearance between the liner 24 and the connector 26.

In the example shown in FIGS. 14a and 14b and as best shown in FIG. 14b, the microgrooves 134 extend from the apex portion 140 onto the webs 136 of the moulding 136. The microgrooves 134 thereby maintain an effective bypass path when the choke 50G is in the collapsed state as shown in FIG. 14b, with minimal clearance between the liner 24 and the connector 26.

The choke variants 50A to 50G shown in FIGS. 12a to 14b share characteristics that are highly beneficial in the context of lined pipelines. For example, the cross-sectional area of a circumferential choke 50 is massively greater than the cross-sectional area of a 'Linavent' vent such as is proposed in WO 2004/011840. This provides a much wider, less constricted and less easily-blocked flow path for the rapid escape under high pressure of any liquid accumulated in the micro-annulus 62 between the liner 24 and the pipe 20 and in the annulus 64 around the connector 26. The ability to equalise pressure rapidly is enhanced by the ability of the choke 50 to deform under high differential pressure, effectively to collapse away from the liner 24 above a threshold differential pressure to allow bypass flow of liquid around the choke 50, through the resulting gap between the liner 24 and the choke 50. Thus, the material and the structure of the choke 50 confers a low modulus of elasticity on the choke 50. Yet, at low differential pressure, the choke 50 bears reliably against the liner 24, regardless of ovalisation, to permit minimal controlled flow that will equalise minor or low-frequency pressure fluctuations without undermining corrosion protection.

The inclination of the barrier web 124 evident in the choke variants 50D, 50E and 50F of FIGS. 12d, 12e, 13a and 13b also lends directional qualities to the choke, which may be tailored provided that the choke remains flexible enough to be attached to the connector 26 and then to allow the connector 26 to be inserted into the lined pipe 20. So, a barrier web 124 inclined to the left as shown in the choke variants 50D, 50E and 50F of FIGS. 12d, 12e, 13a and 13b has an asymmetric response to differential pressure across the choke, presenting a different response to pressure exerted from the right side of the choke, as shown, than to the same pressure exerted from the left side of the choke, as shown. In particular, if the micro-annulus 62 between the liner 24 and the pipe 20 is disposed to the right of the choke variants 50D, 50E and 50F as shown in FIGS. 12d, 12e, 13a and 13b, then liquid will enter the micro-annulus 62 less freely than it can exit the micro-annulus 62. It will be noted in this respect that the inclination of the barrier web 124 as shown is such as to enable substantial flow of liquid from the right, where at high differential pressure the barrier web 124 may bend away from the liner 24 to create a bypass path. Conversely, the inclination of the barrier web 124 is such as to resist substantial flow of liquid from the left. In that case, the barrier web 124 would be forced against the liner 24 to ensure that liquid cannot bypass the choke 50D, 50E and 50F even at high differential pressure but must instead flow through the choke 50D, 50E and 50F. The rate at which liquid flows through the choke 50D, 50E and 50F will then depend on the permeability of the choke 50D, 50E and 50F and the differential pressure to which the choke 50D, 50E and 50F is subjected.

Double parallel chokes 50 at each end of the connector have been mentioned briefly above and illustrated in FIG. 4 of the drawings. This provides some redundancy, for example if one choke 50 perishes and so can be bypassed, but in that case the effective increase in permeability would result in an increase in flow for a given pressure differential across the chokes 50. This should be considered because if the permeability is too low then there is a risk of the chokes 50 becoming clogged over time but if the permeability is too high, then this may encourage corrosion. However, on balance, this is still better than relying upon an o-ring, which either seals or does not; and for reasons of ovality—and, over time, degradation—will not seal properly and so will not contribute effectively to corrosion protection by reliably restricting the flow of fluids between the bore 60 and the internal surface of the pipe 20.

The choke variants 50A to 50G of the invention demonstrate how a choke may be tailored or tuned in various ways, such as permeability, asymmetry and/or the provision of microgrooves. Such measures may be used separately or in conjunction. Additionally, if asymmetric chokes are used at each end of the connector, their directions need not be symmetrical. Also, where there are dual chokes, the chokes at each end of the connector could be in opposition.

In summary, therefore, the invention provides a connector for lined pipes providing continuity of lining, an effective corrosion barrier and chemical barrier, and thermal protection of the corrosion barrier. The liner continuity system of the invention can join pipes made of any material with a connector whose material matches or complements the liner material. Effective pressure equalisation is ensured between the bore and the micro-annulus, with optional provision for threshold differential pressure and tunable pressure and flow rates. The connector maintains thermal insulation properties of the liner with respect to the product carried by the pipeline and the temperature of the environment in which the pipeline operates. It compensates for axial creep of the liner after lining and after pipeline deployment, and also compensates for radial distortion and radial creep of the liner.

The invention claimed is:

1. A pipeline joint arrangement between lined subsea pipes abutting end-to-end as used in the subsea oil and gas industry, wherein the joint arrangement comprises:
   a connector bridging spaced-apart liners of the pipes, the connector having:
      a tube having opposed ends, the tube defining opposed male interface elements extending inwardly from respective ends of the tube; and at least one circumferential permeable choke projecting radially from each male interface element to control fluid flow around the tube in use;

and each liner comprises:
a body section;
an end section of lesser thickness and greater bore than the body section; and
an inner step disposed between the body section and the end section;

and wherein:
a respective male interface element of the connector is received telescopically by the end section of each liner, with mutual clearance defining an annular channel between the male interface element of the connector and the end section of the liner;
a respective end of the tube opposes the inner step of each liner; and
at least one permeable choke extends radially from each male interface element to the opposed end section of each liner to restrict but not prevent fluid flow in the respective annular channels in use of the pipeline, the choke being designed to collapse away from the liner over a threshold differential pressure applied across the choke to permit high-volume flow through the respective annular channels.

2. The pipeline joint arrangement of claim 1, wherein the connector comprises a shoulder formation defined by a band extending circumferentially around the tube.

3. The pipeline joint arrangement of claim 2, wherein spaced-apart bands define respective shoulder formations.

4. The pipeline joint arrangement of claim 3, the connector having an insulator layer around the tube, disposed between the bands.

5. The pipeline joint arrangement of claim 4, wherein the bands project radially beyond an exterior surface of the insulator layer.

6. The pipeline joint arrangement of claim 3, wherein the bands are disposed symmetrically each side of a central plane that bisects the tube and that is oriented orthogonally to a central longitudinal axis of the tube.

7. The pipeline joint arrangement of claim 1, wherein radiusing or chamfering is applied to at least one of: an inner radial end edge of the tube; and an outer radial end edge of the tube.

8. The pipeline joint arrangement of claim 1, wherein the choke comprises a porous mass.

9. The connector of claim 8, wherein the porous mass comprises a foam.

10. The pipeline joint arrangement of claim 1, wherein the choke comprises a barrier web penetrated by openings.

11. The pipeline joint arrangement of claim 10, wherein in longitudinal section, the barrier web is inclined relative to the male element of the tube.

12. The pipeline joint arrangement of claim 11, wherein the barrier web is inclined outwardly from the male element toward the adjacent end of the tube.

13. The pipeline joint arrangement of claim 1, wherein the choke is asymmetric in section.

14. The pipeline joint arrangement of claim 1, wherein the choke is received in a circumferential groove extending around the male interface element.

15. The pipeline joint arrangement of claim 14, and having a gap in the groove beside the choke to accommodate part of the choke when the choke is in a collapsed state.

16. The pipeline joint arrangement of claim 1, wherein the choke is a composite structure comprising first and second components of different stiffness and/or permeability.

17. The pipeline joint arrangement of claim 16, wherein the components are disposed sequentially relative to a fluid flow direction through the choke.

18. The pipeline joint arrangement of claim 1, wherein the choke has a liner-engaging surface with bypass formations.

19. The pipeline joint arrangement of claim 1, wherein the choke has a radially-outer apex formation that is convex in cross section.

20. The pipeline joint arrangement of claim 1 further comprising a plurality of chokes on each male interface element, the chokes being disposed sequentially relative to a fluid flow direction through the chokes.

21. The pipeline joint arrangement of claim 1, wherein the tube has a continuous wall that is uninterrupted by openings between the ends of the tube.

22. The joint arrangement of claim 1, wherein:
the connector further comprises shoulder formations each projecting radially from an exterior surface of the tube and being located inward of respective male interface elements of the connector;
the end section of each liner terminates short of an end of the pipe; and
a shoulder formation of the connector opposes an outer step of the liner disposed between the end section and the pipe.

23. The joint arrangement of claim 22, wherein the shoulder formation defines an overall width of the connector that is less than the internal diameter of the pipes between abutting ends of the pipes and the end sections of liners of the pipes.

24. The joint arrangement of claim 1, wherein the distance between the inner steps of the liners is longer than the tube of the connector, leaving a gap to at least one end of the tube that communicates between one of the channels and the bore of the tube.

25. The joint arrangement of claim 1, wherein radiusing or chamfering is applied to at least one of: an inner radial edge of the outer step; and an inner radial edge of the inner step.

26. The joint arrangement of claim 1, wherein the choke bears resiliently against the end section of the liner with radial force.

27. The joint arrangement of claim 1, wherein the choke is collapsible away from the liner over a threshold differential pressure applied across the choke.

28. The joint arrangement of claim 1, wherein the choke has asymmetric response to pressure within the channel to each side of the choke.

29. The joint arrangement of claim 1, wherein the liners of the pipes are oversized, rolled-down and pultruded into position without locking rings.

30. A pipeline comprising a plurality of joint arrangements between lined subsea pipes abutting end-to-end as used in the subsea oil and gas industry, each joint arrangement comprising:
a connector bridging spaced-apart liners of the pipes, the connector having:
a tube having opposed ends, the tube defining opposed male interface elements extending inwardly from respective ends of the tube; and
at least one circumferential permeable choke projecting radially from each male interface element to control fluid flow around the tube in use;
and each liner comprises:
a body section;
an end section of lesser thickness and greater bore than the body section; and an inner step disposed between the body section and the end section;

and wherein:
a respective male interface element of the connector is received telescopically by the end section of each liner, with mutual clearance defining an annular channel between the male interface element of the connector and the end section of the liner;
a respective end of the tube opposes the inner step of each liner; and
at least one permeable choke extends radially from each male interface element to the opposed end section of each liner to restrict but not prevent fluid flow in the respective annular channels in use of the pipeline, the choke being designed to collapse away from the liner over a threshold differential pressure applied across the choke to permit high-volume flow through the respective annular channels.

31. A method of assembling a pipeline joint, comprising:
providing a first lined subsea pipe whose liner comprises:
a body section; and
an end section of lesser thickness and greater bore than the body section;
inserting into the end of the first pipe a connector comprising:
a tube having opposed ends, the tube defining opposed male interface elements extending inwardly from respective ends of the tube; and
at least one circumferential permeable choke projecting radially from each male interface element to restrict but not prevent fluid flow around the tube in use;
such that one male interface element of the connector is received telescopically by the end section of the liner with the choke extending radially between the male interface element and the end section, while leaving the opposed male interface element protruding from the end of the first pipe;
bringing a second lined pipe into end-to-end abutting relation with the first pipe, the liner of the second pipe having a corresponding body section and end section such that the opposed male interface element of the connector is received telescopically by the end section of the liner of the second pipe, with the choke of the opposed male interface element extending radially between that male interface element and that end section; and
joining the pipes where they abut end-to-end.

* * * * *